United States Patent
Kimoto

(10) Patent No.: US 9,514,095 B2
(45) Date of Patent: Dec. 6, 2016

(54) CONTENT PLAYBACK APPARATUS, CONTENT PLAYBACK METHOD, AND PROGRAM

(75) Inventor: Hiroshi Kimoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 603 days.

(21) Appl. No.: 13/588,313

(22) Filed: Aug. 17, 2012

(65) Prior Publication Data

US 2013/0211565 A1 Aug. 15, 2013

(30) Foreign Application Priority Data

Oct. 4, 2011 (JP) ................................. 2011-220027

(51) Int. Cl.
*G06F 17/00* (2006.01)
*G06F 17/30* (2006.01)
*G06F 3/0484* (2013.01)

(52) U.S. Cl.
CPC ............ *G06F 17/00* (2013.01); *G06F 3/04847* (2013.01); *G06F 17/30752* (2013.01); *G06F 17/30769* (2013.01); *G06F 17/30772* (2013.01)

(58) Field of Classification Search
CPC ............ G06F 17/30772; G06F 17/3074; G06F 17/30743; G06F 17/30775; G06F 3/0481
See application file for complete search history.

(56) References Cited

U.S. PATENT DOCUMENTS

2008/0141133 A1* 6/2008 Yamamoto ........ G06F 17/30743
715/716

2012/0254806 A1* 10/2012 Gossweiler ....... G06F 17/30053
715/835

FOREIGN PATENT DOCUMENTS

| JP | 8-137902 A | 5/1996 |
|---|---|---|
| JP | 2001-209660 A | 8/2001 |
| JP | 2006-146980 A | 6/2006 |
| JP | 2007-287256 A | 11/2007 |
| JP | 2008-145696 A | 6/2008 |
| JP | 2010-3368 A | 1/2010 |
| JP | 4577412 | 9/2010 |

OTHER PUBLICATIONS

Tzanetakis, "Musescape: A Toll for Changing Music Collections into Libraries", Feb. 25, 2004, Research and Advanced Technology for Digital Libraries; [Lecture Notes in Computer Science;;LNCS], Springer-Verlag, XP019001585, pp. 412-421.*
Miser, "Sams Teach Yourself ITunes 10 in 10 Minutes", Dec. 2010, Pearson Education, Retrieved from the Internet: URL:http://proquest.safaribooksonline.com/book/audio/9780132618328, XP055053224, 229 pages.*
Extended European Search Report issued Feb. 21, 2013, in Application No. / Patent No. 12186352.6-1952.

(Continued)

*Primary Examiner* — Fan Tsang
*Assistant Examiner* — David Siegel
(74) *Attorney, Agent, or Firm* — Oblon, McClelland, Maier & Neustadt, L.L.P.

(57) ABSTRACT

An information processing apparatus that controls a reproduction section to reproduce first content having a first melodic parameter; receives a user input corresponding to a change in the first melodic parameter; and controls the reproduction section to reproduce second content having a second melodic parameter based on the received user input.

22 Claims, 16 Drawing Sheets

(56) References Cited

OTHER PUBLICATIONS

George Tzanetakis, "Musescape: A Toll for Changing Music Collections into Libraries", Research and Advanced Technology for Digital Libraries; [Lecture Notes in Computer Science;;LNCS], Springer-Verlag, XP019001585, Feb. 25, 2004, pp. 412-421.
Brad Miser, "Sams Teach Yourself ITunes 10 in 10 Minutes" Retrieved from the Internet: URL:http://proquest.safaribooksonline.com/book/audio/9780132618328, XP055053224, Dec. 2010, 19 pages.

* cited by examiner

FIG. 4
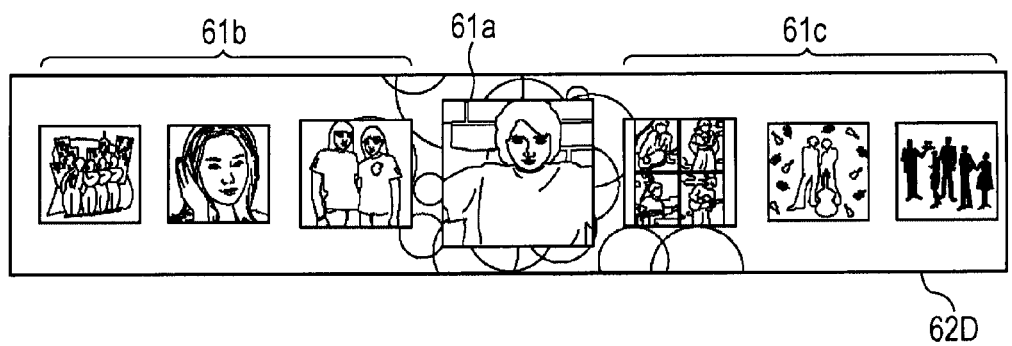
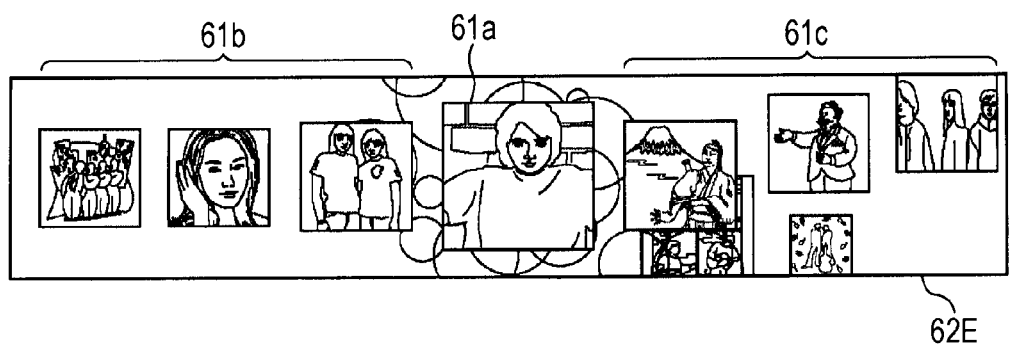
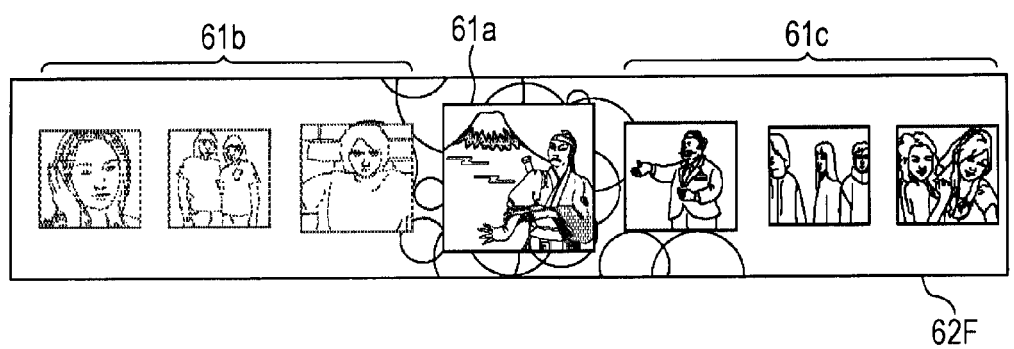

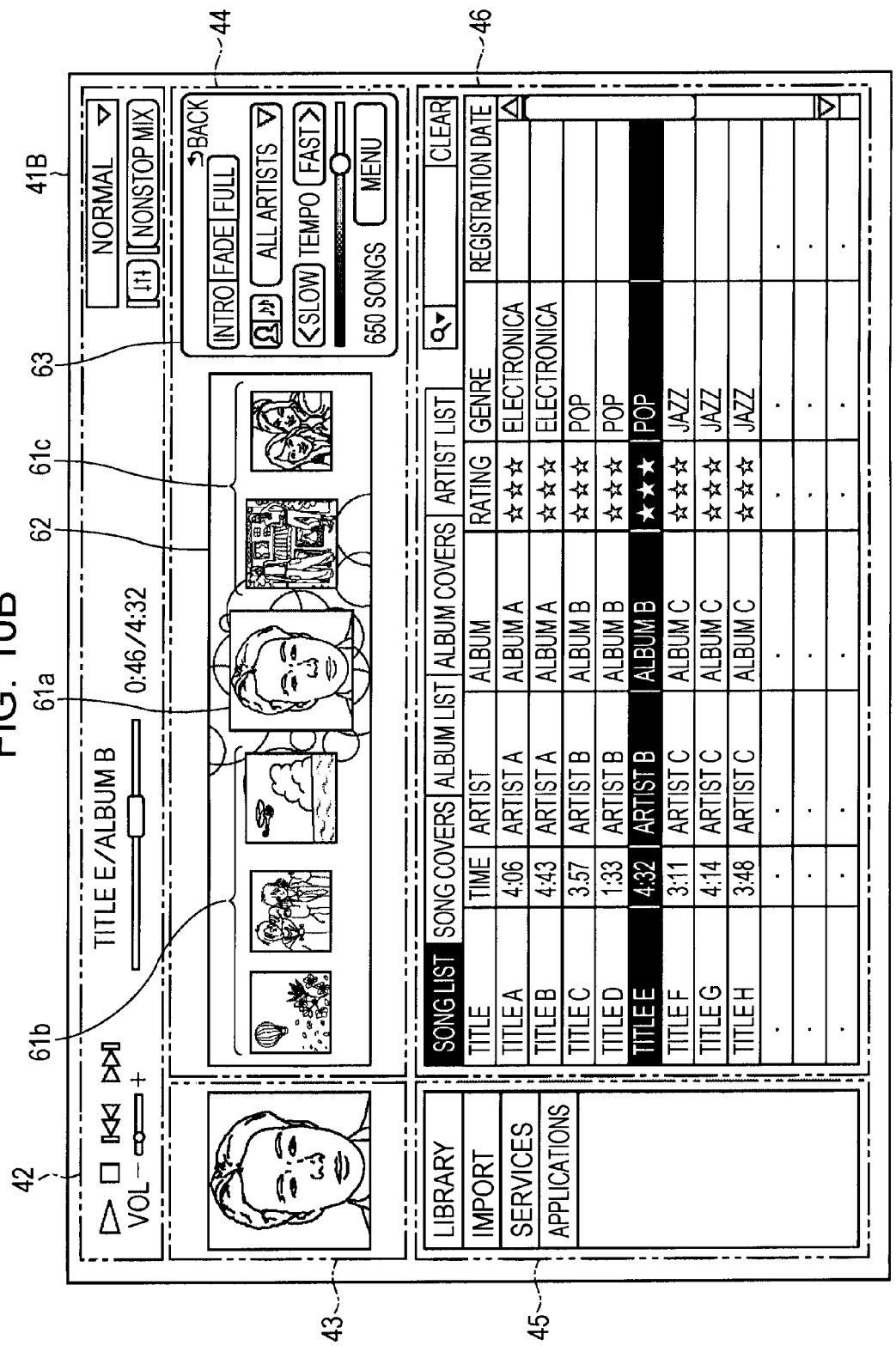

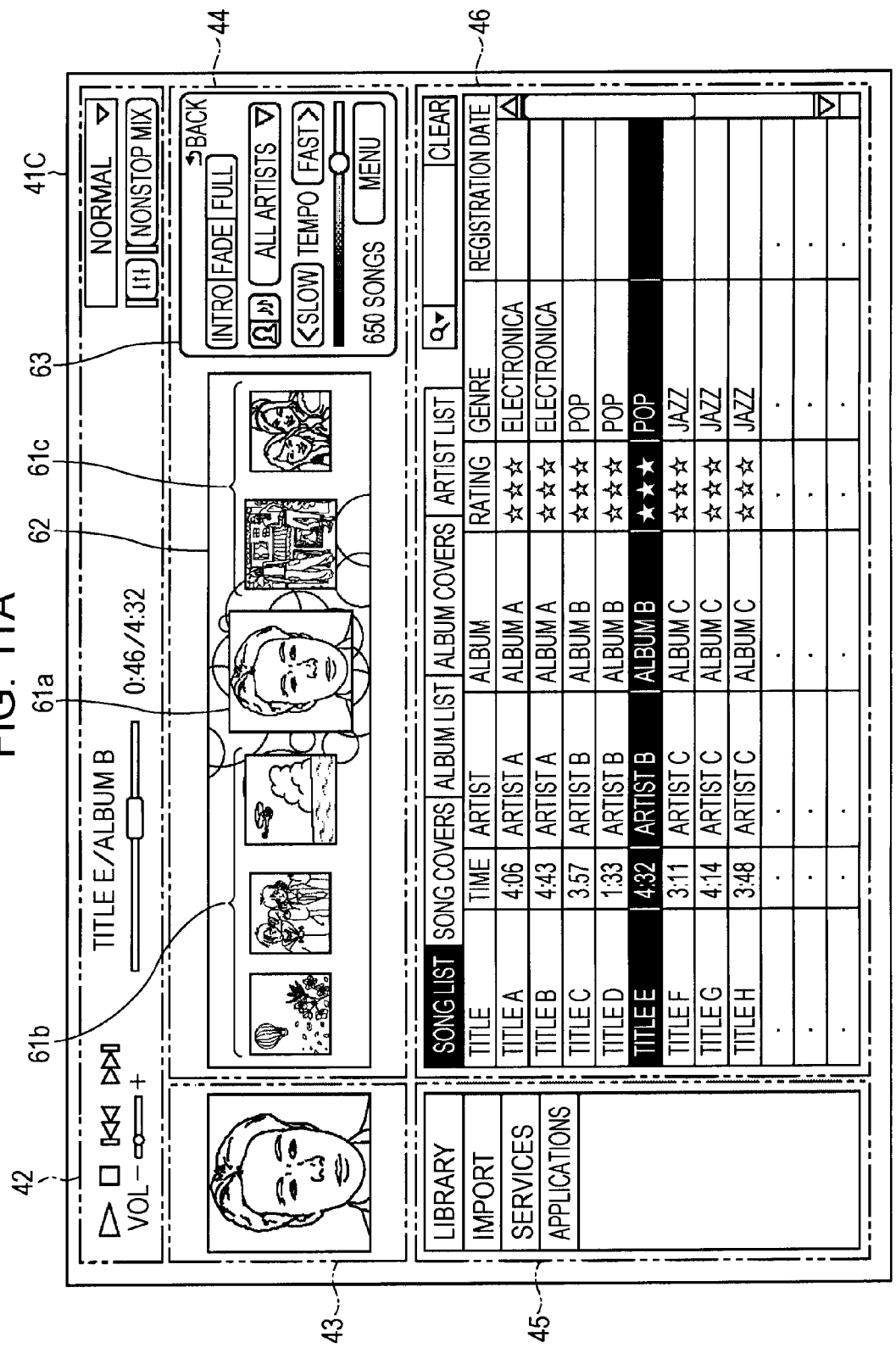

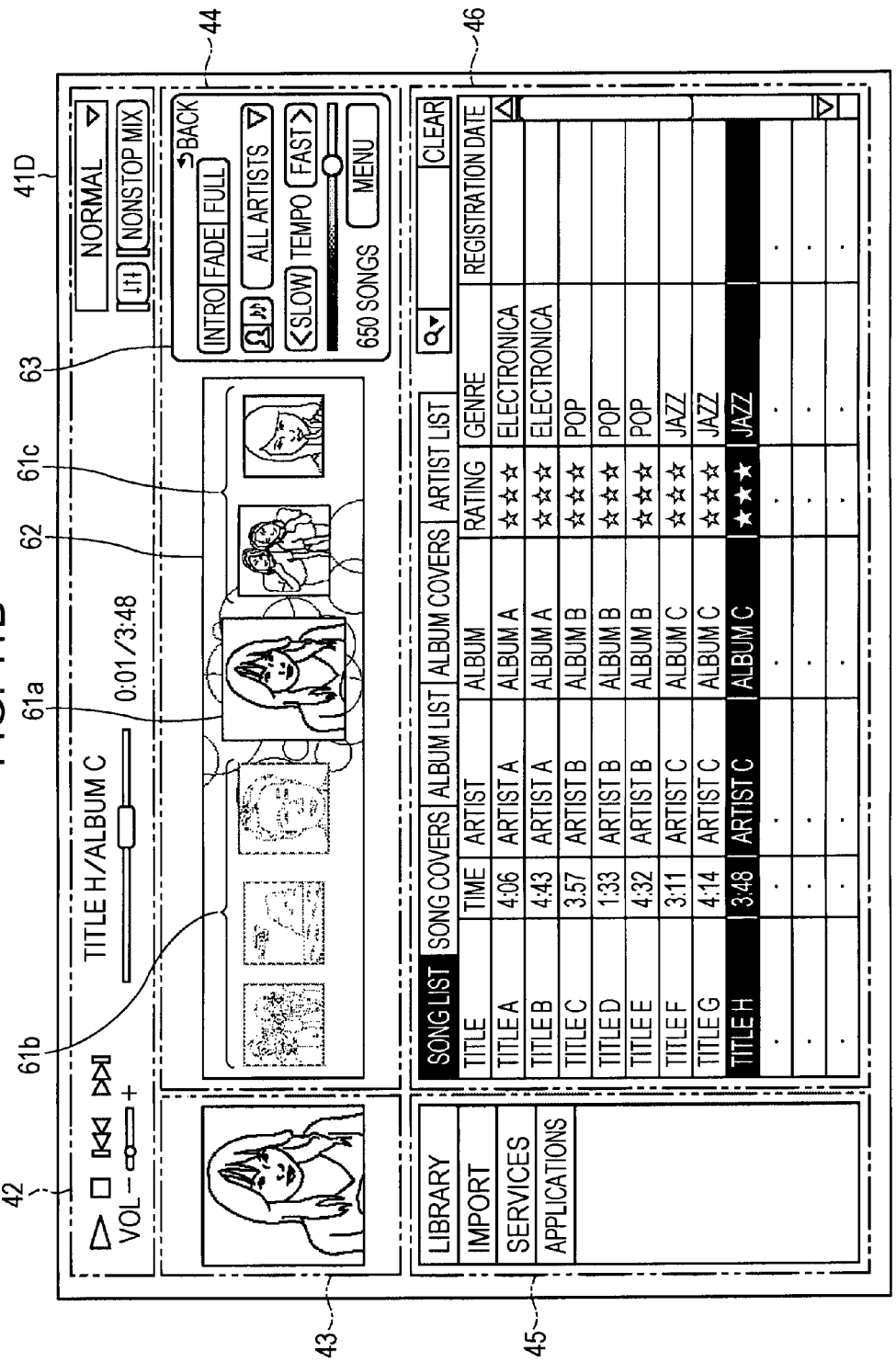

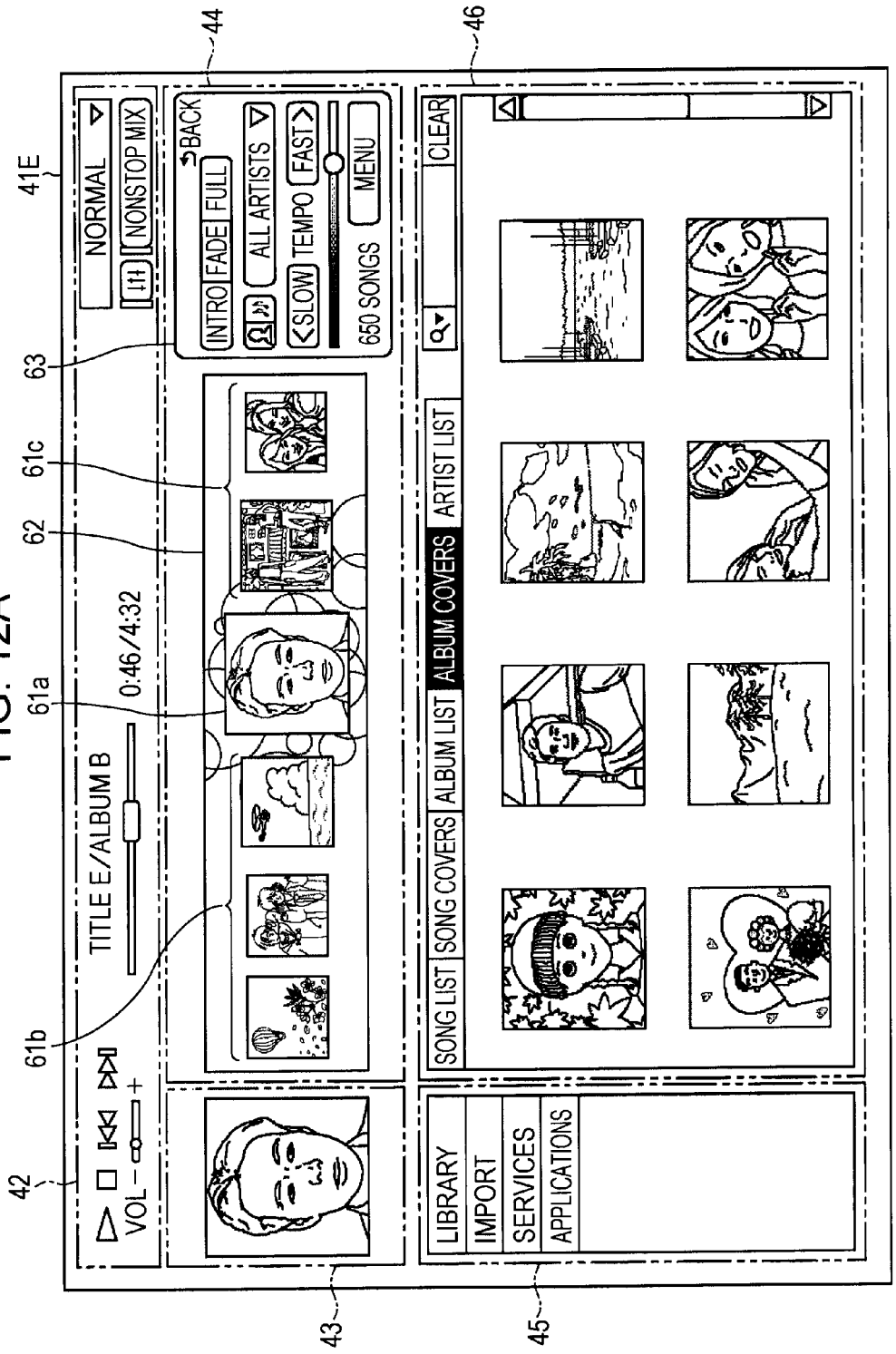

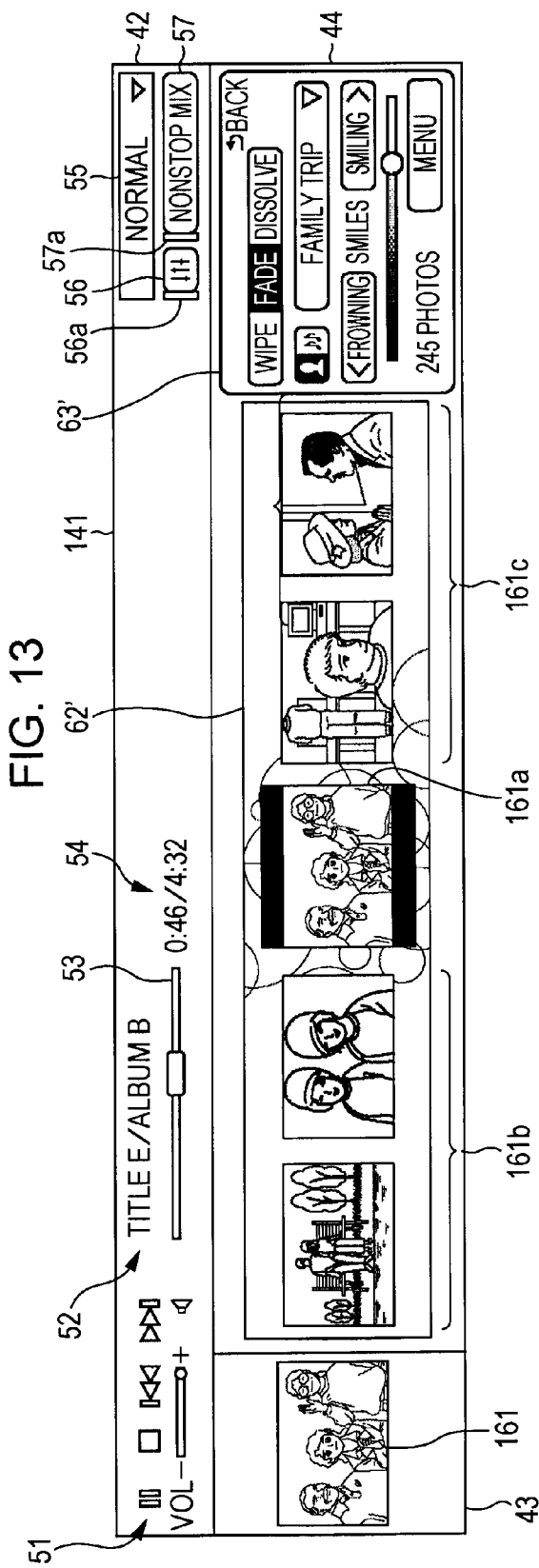

CONTENT PLAYBACK APPARATUS, CONTENT PLAYBACK METHOD, AND PROGRAM

CROSS REFERENCE TO RELATED APPLICATION

This application claims the benefit of priority under 35 U.S.C. §119 to Japanese Priority Patent Application JP 2011-220027 filed in the Japan Patent Office on Oct. 4, 2011, the entire contents of which are hereby incorporated by reference.

BACKGROUND

The present disclosure relates to a content playback apparatus, a content playback method, and a program, and more particularly, to a content playback apparatus, a content playback method, and a program configured to be able to filter and playback content matching the user's tastes.

Existing playback apparatus that play back content are provided with functions for continuous playback of content according to a playlist containing a plurality of content items that reflect the user's tastes. With these functions, techniques are implemented such that the user may create a playlist by manually selecting a plurality of content items assumed to match his or her tastes in advance, or the user may manually select a playlist assumed to match his or her tastes in advance, for example.

However, it has been difficult to reflect user's tastes and increase taste matching scores with techniques that involve the user manually selecting content items in advance, since the question of whether or not the content included in the playlist matches the user's tastes is indeterminate until the content is played back. For this reason, users increasingly tend to select content they are already familiar with in order to create a playlist containing content that better matches their tastes, and as a result, have fewer chances to discover new content.

Accordingly, the present Inventor has proposed an information processing apparatus that creates a playlist by extracting at least one or more other candidates associated with content not belonging to any playlist (see Japanese Patent No. 4577412, for example).

SUMMARY

According to a first exemplary embodiment, the disclosure is directed to an information processing apparatus comprising: a processing unit that controls a reproduction section to reproduce first content having a first melodic parameter; receives a user input corresponding to a change in the first melodic parameter; and controls the reproduction section to reproduce second content having a second melodic parameter based on the received user input.

According to another exemplary embodiment, the disclosure is directed to an information processing method performed by an information processing apparatus, the method comprising: controlling a reproduction section to reproduce first content having a first melodic parameter; receiving a user input corresponding to a change in the first melodic parameter; and controlling the reproduction section to reproduce second content having a second melodic parameter based on the received user input.

According to another exemplary embodiment, the disclosure is directed to a non-transitory computer-readable medium including computer-program instructions, which when executed by an information processing apparatus, cause the information processing apparatus to perform a method, the method comprising: controlling a reproduction section to reproduce first content having a first melodic parameter; receiving a user input corresponding to a change in the first melodic parameter; and controlling the reproduction section to reproduce second content having a second melodic parameter based on the received user input.

BRIEF DESCRIPTION OF THE DRAWINGS

FIG. 4 is a diagram used to describe the switching of displayed playback candidate cover images;

FIGS. 10A and 10B are diagrams used to describe operations linking a function UI display area with a library UI display area;

FIGS. 11A and 11B are diagrams used to describe operations linking a function UI display area with a library UI display area;

FIGS. 12A and 12B are diagrams used to describe operations linking a function UI display area with a library UI display area;

FIG. 13 illustrates a content playback screen displayed when viewing photos.

DETAILED DESCRIPTION OF EMBODIMENTS

Hereinafter, specific embodiments in accordance with the present technology will be described in detail and with reference to the drawings.

Figure 1:
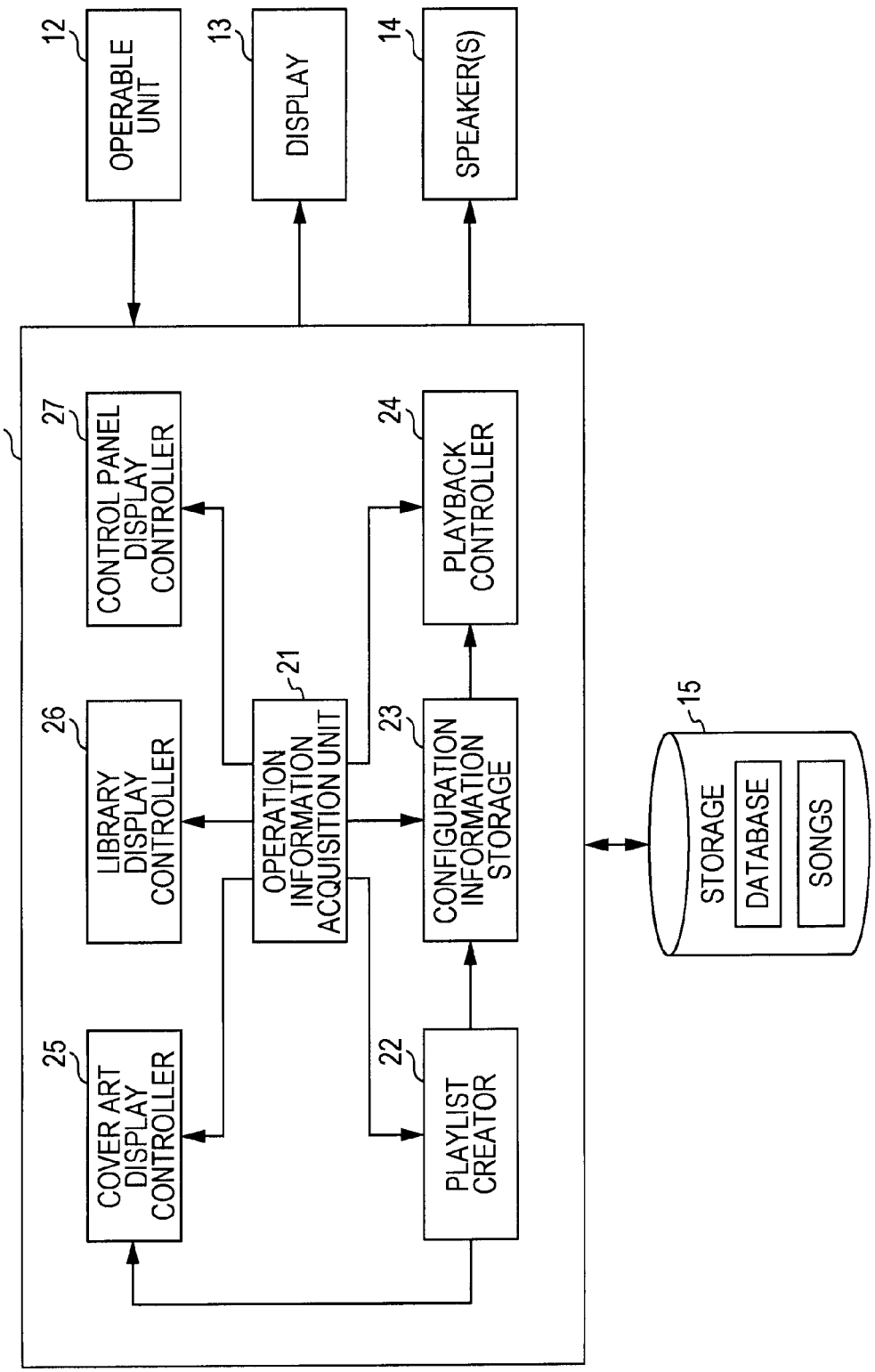
FIG. 1 is a block diagram illustrating an exemplary configuration of a content playback apparatus according to an embodiment of the present technology.

FIG. 1 is a block diagram illustrating an exemplary configuration of a content playback apparatus according to an embodiment of the present technology.

As illustrated in FIG. 1, a content playback apparatus 11 is connected to an operable unit 12, a display 13, one or more speakers 14, and storage 15.

The operable unit 12 may include components such as a mouse, keyboard, or touch sensor, and supplies the content playback apparatus 11 with operation signals that reflect user operations. The display 13 may include a liquid crystal display (LCD) panel or an organic light-emitting diode (OLED) panel, and displays images output from the content playback apparatus 11. The one or more speakers 14 output music or other audio output from the content playback apparatus 11.

The storage 15 may include components such as a hard disk drive or flash memory, and stores a plurality of content items such as songs to be played back by the content playback apparatus 11, as well as a database in which information associated with individual songs is registered. Information such as the title, playback time, artist, album, rating, genre, and registration date may be registered in the database, for example. Additionally, information expressing song characteristics such as tempo, mood, type, and style (hereinafter designated "features") may also be registered for individual songs in the database. Note that such features may be automatically acquired by analyzing songs, as described in detail in, for example, Japanese Unexamined Patent Application Publication No. 2007-121456 already submitted for application by the present Inventor.

The content playback apparatus 11 is then able to reference the database stored in the storage 15 and execute continuous playback of a combination of multiple songs (hereinafter designated a "nonstop mix" where appropriate). At this point, by adjusting melodic parameters such as the tempo, mood, type, or style, the user is able to perform operations so as to play back a nonstop mix suited to the user's own mood or atmosphere.

The content playback apparatus 11 is provided with an operation information acquisition unit 21, a playlist creator 22, configuration information storage 23, a playback controller 24, a cover art display controller 25, a library display controller 26, and a control panel display controller 27.

The operation information acquisition unit 21 acquires operation information output from the operable unit 12 as a result of being operated by the user, and on the basis of such operation information, outputs various instructions to the blocks constituting the content playback apparatus 11.

The playlist creator 22 follows instructions from the operation information acquisition unit 21 to reference the database stored in the storage 15 and create a playlist according to the user operations. For example, if the user operates the operable unit 12 and changes one or more melodic parameters, the playlist creator 22 may reference the database stored in the storage 15 and select candidate songs for playback in accordance with the changed parameters. The playlist creator 22 may then create a playlist by taking songs selected in accordance with the changed parameters and arranging them in a given order, such as in a random order, for example.

Furthermore, suppose that while a nonstop mix is being played back by the content playback apparatus 11, the user adjusts a parameter specifying the tempo so as to play songs with a faster tempo than the songs currently playing, for example. In this case, the playlist creator 22 may reference the database stored in the storage 15, extract songs with a faster tempo than the songs currently playing, and construct a new playlist containing the extracted songs accordingly.

The configuration information storage 23 stores information such as playlists created by the playlist creator 22 and configuration information specifying various settings regarding content playback by the content playback apparatus 11. Such configuration information may include configuration information specifying the playback method for a nonstop mix by the content playback apparatus 11, for example. Playback methods for nonstop mixes may include intro, which plays back just the intro portions of songs, crossfading, which fades out the last song and fades in the next song when changing songs, and full playback, which plays back songs in their entirety.

The playback controller 24 reads out a song for playback from the storage 15 on the basis of a playlist and configuration information stored in the configuration information storage 23, and plays back the song so as to be output from the speakers 14. Also, if the user operates the operable unit 12 and inputs an operation related to song playback (such as Play, Stop, or Pause, for example), the operation information acquisition unit 21 issues instructions reflecting the user operation, and the playback controller 24 controls song playback according to the instructions. The playback controller 24 also controls song playback in the playlist order and according to a playback method specified by the user from among the intro, crossfading, and full playback methods.

Figure 2:
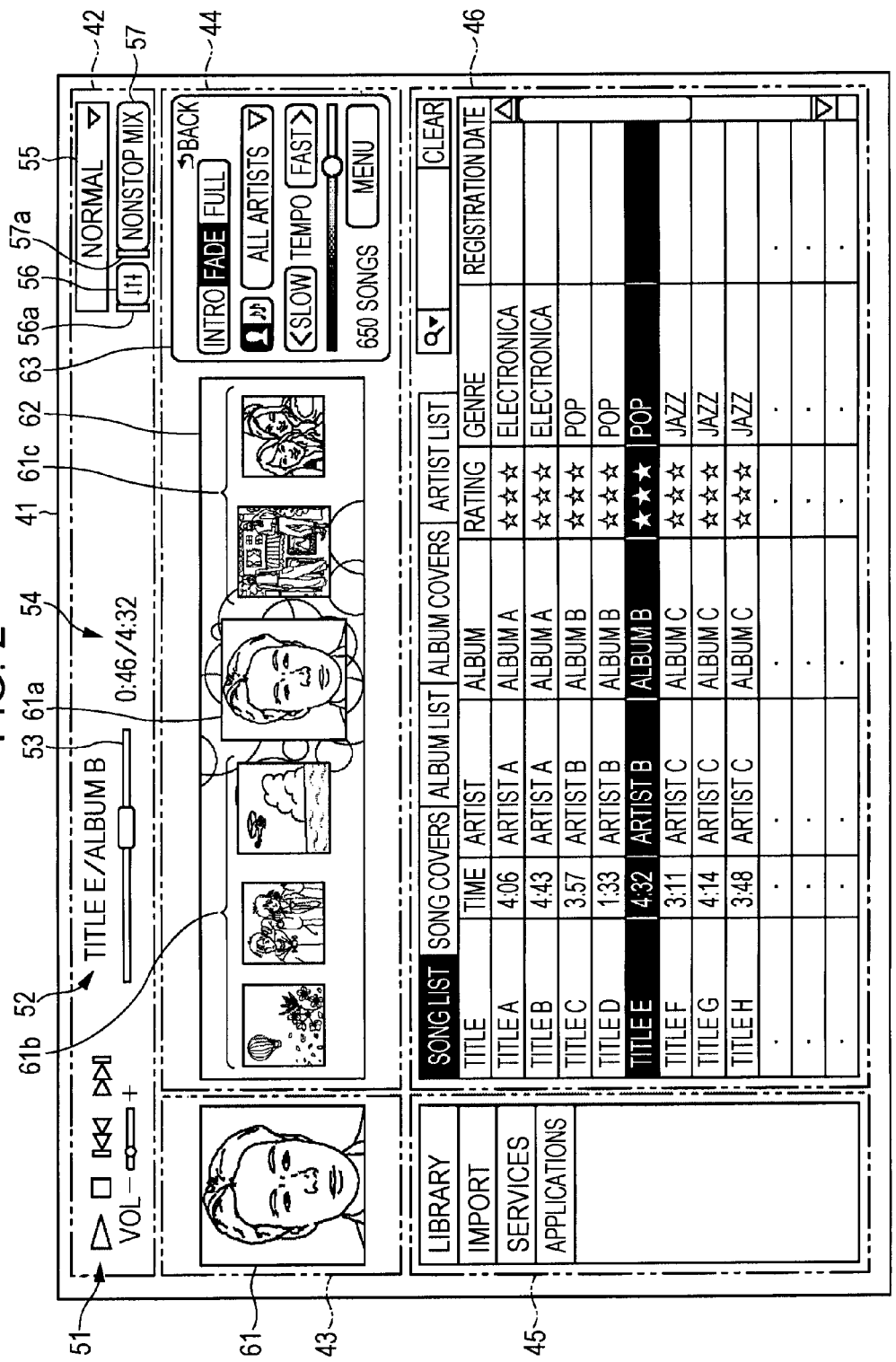
FIG. 2 illustrates a content playback screen.

The cover art display controller 25, the library display controller 26, and the control panel display controller 27 apply control related to the display of a content playback screen which is displayed on the display 13 when songs are being played back by the content playback apparatus 11. As illustrated in FIG. 2, a user interface (UI) containing a plurality of graphical user interface (GUI) components is displayed on the content playback screen.

Next, a content playback screen will be described with reference to FIG. 2.

The content playback screen 41 is provided with a base UI display area 42, a now playing display area 43, a function UI display area 44, a file operation UI display area 45, and a library UI display area 46.

Displayed in the base UI display area 42 are a playback operation GUI component 51, a title display section 52, a time display bar 53, a time display section 54, a dropdown list 55, a nonstop mix button 57, and an equalizer button 56.

The playback operation GUI component 51 contains GUI components for performing basic operations related to song playback by the content playback apparatus 11, such as buttons for specifying Play, Stop, Previous, and Next, as well as a volume bar for adjusting the song playback volume, for example.

Displayed in the title display section 52 are the title of the song currently being played by the content playback apparatus 11, as well as the title of the album containing that song. In the exemplary display in FIG. 2, the title display section 52 indicates that a song named "Title E" and recorded on an album named "Album B" is currently playing.

The time display bar 53 is a GUI component indicating a playback position corresponding to the playback time of the song currently being played by the content playback apparatus 11. Additionally, a highlight portion corresponding to the playback time of a song is displayed on the time display bar 53 in the case where intro is specified as the playback method for a nonstop mix.

Displayed in the time display section 54 are the playback time and the playback position of the song currently being played by the content playback apparatus 11. In the exemplary display in FIG. 2, the time display section 54 indicates that playback is currently at a playback position of "0:46" out of a playback time of "4:32".

The dropdown list 55 is a GUI component for selecting a song playback method to be used by the content playback apparatus 11. For example, playback methods such as normal, in which songs are played back in playlist order, shuffle, in which songs are played back in a random order, and repeat, in which the same song is played back repeatedly, may be selected from the dropdown list 55. In the exemplary display in FIG. 2, the dropdown list 55 indicates that the playback method "Normal" has been selected. Note than in the case where a nonstop mix is playing, the selectable song playback methods may be limited to just normal playback.

The equalizer button 56 is a GUI component that specifies whether or not to enable equalizer functions which adjust the overall sound quality by boosting or reducing specific frequency bands in songs played back by the content playback apparatus 11. In the case where the user operates the equalizer button 56 and enables the equalizer functions, an indicator 56a placed next to the equalizer button 56 is switched on. In addition, if the equalizer functions are enabled, a user interface reflecting the equalizer functions (not illustrated) is displayed in the function UI display area 44.

The nonstop mix button 57 is a GUI component specifying whether or not to play back a nonstop mix. In the case where the user operates the nonstop mix button 57 and a nonstop mix is playing, an indicator 57*a* placed next to the nonstop mix button 57 is switched on. Also, if a nonstop mix is played back, a user interface reflecting the functions available for a nonstop mix are displayed in the function UI display area 44.

Displayed in the now playing display area 43 is a cover image 61 of the album containing the song being played back by the content playback apparatus 11.

Displayed in the function UI display area 44 is a user interface reflecting user-selected functions when content is played back by the content playback apparatus 11. In the exemplary display in FIG. 2, a cover art display section 62 and a control panel 63 are displayed as a user interface reflecting the functions available for a nonstop mix.

Displayed in the cover art display section 62 are a plurality of cover images 61, which are displayed in the order of playback by the content playback apparatus 11. Display in the cover art display section 62 is controlled by the cover art display controller 25.

For example, a cover image 61 of the album containing the song currently playing (hereinafter designated the now playing cover image 61*a* where appropriate) may be displayed in the central part of the cover art display section 62. The now playing cover image 61*a* may also be displayed at a larger size than other cover images 61 in the cover art display section 62.

To the left of the now playing cover image 61*a* are displayed cover images of albums containing songs that already have been played back (hereinafter designated playback history cover images 61*b* where appropriate). In the exemplary display in FIG. 2, three playback history cover images 61*b* are displayed, with songs played back earlier being represented by their album cover images farther to the left. Also, once the song recorded on the album with the now playing cover image 61*a* is played back in its entirety, the now playing cover image 61*a* moves to the left and becomes a playback history cover image 61*b*. At this point, the plurality of playback history cover images 61*b* each shift one space to the left, and the playback history cover image 61*b* that was at the leftmost edge ceases to be displayed.

To the right of the now playing cover image 61*a* are displayed cover images of albums containing songs which are candidates for playback according to the playlist (hereinafter designated playback candidate cover images 61*c* where appropriate). In the exemplary display in FIG. 2, two playback candidate cover images 61*c* are displayed, with songs to be played back later being represented by their album cover images farther to the right. Also, once the song recorded on the album with the now playing cover image 61*a* is played back in its entirety, the playback candidate cover image 61*c* immediately to the right of the now playing cover image 61*a* moves to the left and becomes the now playing cover image 61*a*. At this point, the plurality of playback candidate cover images 61*c* each shift one space to the left, and a new playback candidate cover image 61*c* is displayed at the rightmost edge.

Displayed in the control panel 63 are GUI components enabling the user to perform operations related to playing back a nonstop mix. For example, the user is able to operate the control panel 63 so as to play back songs with a faster or slower tempo than the song currently playing. Herein, display of the control panel 63 is controlled by the control panel display controller 27, the details of which will be later described in detail and with reference to FIG. 6.

Displayed in the file operation UI display area 45 is a user interface for performing file operations to specify content for playback by the content playback apparatus 11. From the file operation UI display area 45, loading from a given library, importing from a disk medium on which content is recorded, downloading from a content-providing service, or loading from another application can be specified.

Displayed in the library UI display area 46 is information registered in a library (i.e., a database) as content for playback by the content playback apparatus 11. The display format of the library UI display area 46 can be specified by tabs, which are GUI components displayed at the top of the library UI display area 46. For example, a song list, song covers, an album list, album covers, or an artist list may be specified as the display format of the library UI display area 46. In the exemplary display in FIG. 2, a song list has been specified as the display format of the library UI display area 46. Display in the library UI display area 46 is controlled by the library display controller 26.

In the case where a song list has been specified as the display format, a list of song titles, playback times, artists, albums, ratings, genres, and registration dates is displayed in the library UI display area 46. Additionally, the row displaying the song currently playing is highlighted. The exemplary display in FIG. 2 illustrates a song named "Title E" being played back. In addition, a GUI component used to search for content is also displayed in the library UI display area 46.

In this way, a content playback screen 41 like that illustrated in FIG. 2 is displayed on the display 13 when a nonstop mix is being played back by the content playback apparatus 11. Furthermore, the display of the content playback screen 41 changes according to user operations.

Figure 3:
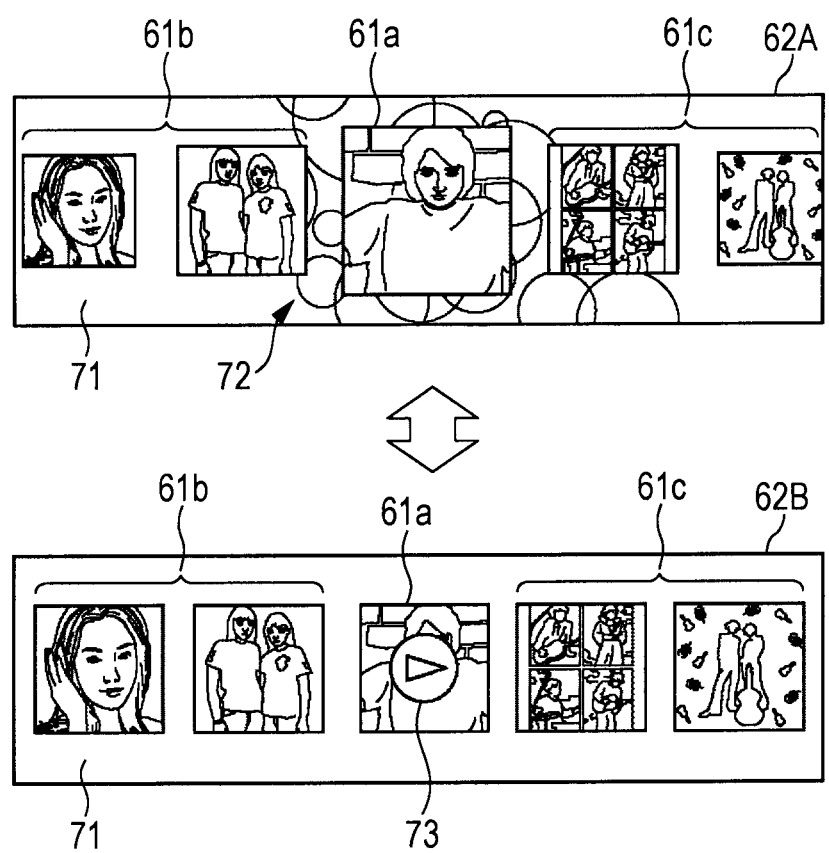
FIG. 3 illustrates a cover art display unit.

For example, the display of the cover art display section 62 of the function UI display area 44 may change according to whether or not a song is currently playing, as illustrated in FIG. 3.

The upper part of FIG. 3 illustrates a cover art display section 62A from when a song is currently playing, whereas the lower part of FIG. 3 illustrates a cover art display section 62B from when a song is paused.

For example, in the case where a song is currently playing, the now playing cover image 61*a* is displayed slightly larger (such as approximately 10% larger) than the playback history cover images 61*b* and the playback candidate cover images 61*c* in the cover art display section 62A. Additionally, a dynamic computer-generated bubble motif 72 in which multiple bubbles seem to come forth is displayed in a background section 71 that acts as background to the plurality of cover images 61 displayed in the cover art display section 62A.

The background color of the background section 71 changes according to melodic parameters for the song currently playing (such as tempo, mood, type, or style, for example). In the bubble motif 72, the sizes of respective bubbles and the speed at which bubbles appear and move may change according to the sound pressure and frequency band of the song currently playing. For example, the bubble motif 72 may change such that larger bubbles appear as the sound pressure increases in the song currently playing, and such that more bubbles appear as the frequency band increases in the song currently playing.

In contrast, in the case where a song is currently paused, the now playing cover image 61*a* is displayed at the same size as the playback history cover images 61*b* and the playback candidate cover images 61*c* in the cover art display section 62B. Additionally, a mark 73 indicating playback is displayed overlaid on top of the now playing cover image 61*a*. Also, at this point, the bubble motif 72 is not displayed, and although not illustrated, the background section 71 displays a background color that moves slightly as though breathing.

Suppose that the user uses the operable unit 12 (such as a mouse, for example) to double-click the now playing cover image 61*a* while the cover art display section 62A is being displayed. In response, the content playback apparatus 11 pauses song playback and switches the display from the cover art display section 62A to the cover art display section 62B. In other words, the operation information acquisition unit 21 obeys operation information output from the operable unit 12 and issues instructions for pausing song playback to the playback controller 24, while also issuing instructions for switching to the cover art display section 62B to the cover art display controller 25.

Conversely, suppose that the user uses the operable unit 12 to double-click the now playing cover image 61*a* while the cover art display section 62B is being displayed. In response, the content playback apparatus 11 resumes song playback and switches the display from the cover art display section 62B to the cover art display section 62A. In other words, the operation information acquisition unit 21 obeys operation information output from the operable unit 12 and issues instructions for pausing song playback to the playback controller 24, while also issuing instructions for switching to the cover art display section 62B to the cover art display controller 25.

Meanwhile, subtle display effects are presented when changing the display of the cover art display section 62A and the cover art display section 62B in response to play and pause operations.

Furthermore, if the user uses the operable unit 12 to click the now playing cover image 61*a* while a song is playing, information on the song currently playing is displayed in the library UI display area 46, as discussed later with reference to FIG. 12.

Suppose that the user uses the operable unit 12 to double-click a playback history cover image 61*b*, for example, while a song is playing. In response, the content playback apparatus 11 plays the song recorded on the album indicated by the playback history cover image 61*b* specified by the user operation, while in addition, a dynamic display is presented such that the cover image 61 moves to the central part of the cover art display section 62 to be displayed as the now playing cover image 61*a*. Moreover, the cover images 61 that were displayed to the left and right of the playback history cover image 61*b* specified by the user operation also move in conjunction with the rest of the movement inside the cover art display section 62.

Also, if the user uses the operable unit 12 to, for example, operate the control panel 63 and modify one or more melodic parameters while a song is playing, a playlist reconstructed with candidate songs for playback according to the modifications is created. In other words, the operation information acquisition unit 21 supplies modified parameters to the playlist creator 22 in accordance with operation information output from the operable unit 12. The playlist creator 22 then selects new candidate songs for playback on the basis of the parameters, and creates a new playlist containing the selected songs.

At this point, a dynamic display is presented in the cover art display section 62 such that the playback candidate cover images 61*c* are switched out on the basis of the newly created playlist.

The switching of displayed playback candidate cover images 61*c* will now be described with reference to FIG. 4.

The upper part of FIG. 4 illustrates a cover art display section 62D before the playback candidate cover images 61*c* are switched, while the central part of FIG. 4 illustrates a cover art display section 62E while the cover image 61*c* are being switched. The lower part of FIG. 4 illustrates a cover art display section 62F after the playback candidate cover images 61*c* are switched.

When a new playlist is created in response to a user-specified change of parameters, a number of playback candidate cover images 61*c* displayable in the cover art display section 62 are selected from the playlist in playback order. Then, as illustrated by the cover art display section 62E, the playback candidate cover images 61*c* from before the parameter change shrink while moving downward, whereas the playback candidate cover images 61*c* from after the parameter change dynamically appear as though falling down from above.

After that, a cover image 61 of the album containing the first song selected on the basis of the new playlist from after the parameter change is displayed as the now playing cover image 61*a*, as illustrated by the cover art display section 62F. In this way, the switching of playback candidate cover images 61*c* due to a change of melodic parameters is effectively presented in the content playback apparatus 11.

Meanwhile, the content playback apparatus 11 may be configured such that playing songs by operating the playback history cover images 61*b* is prohibited in the case where a new playlist is created due to a parameter change. At this point, the playback history cover images 61*b* may be displayed in a lighter color than the other cover images 61 so as to indicate that operations will not be accepted.

As another example, if the content playback screen 41 is resized, the size of the cover art display section 62 may also be resized accordingly. In such cases, it may be configured such that the now playing cover image 61*a* is still displayed in the central part of the cover art display section 62 even after a resize. In addition, the number of cover images 61 displayed as playback history cover images 61*b* as well as the number of cover images 61 displayed as playback candidate cover images 61*c* may be increased or decreased according to the horizontal length of the cover art display section 62.

Also, suppose that the user uses the operable unit 12 (such as a mouse, for example) to move a pointer displayed on the content playback screen 41 over a cover image 61 (referred to as a mouseover). In this case, information regarding the item (such as the album title and artist name) may be displayed above that cover image 61.

In this way, when the content playback apparatus 11 plays a nonstop mix, a cover art display section 62 and a control panel 63 are displayed in a function UI display area 44 as a user interface reflecting the functions available for a nonstop mix.

Meanwhile, suppose that while a nonstop mix is playing on the content playback apparatus 11, the equalizer button 56 is operated and equalizer functions are enabled, for example. At this point, the nonstop mix continues to play, while in the function UI display area 44, the cover art display section 62 and the control panel 63 are hidden and a user interface reflecting equalizer functions is displayed. Conversely, a user interface reflecting functions other than equalizer functions may be displayed in the function UI display area 44 in response to a user operation performed while the equalizer functions are enabled.

Thus, in the function UI display area 44, it is possible to determine whether or not equalizer functions are enabled by checking the indicator 56a, and it is possible to check whether or not a nonstop mix is playing by checking the indicator 57a.

Figure 5:
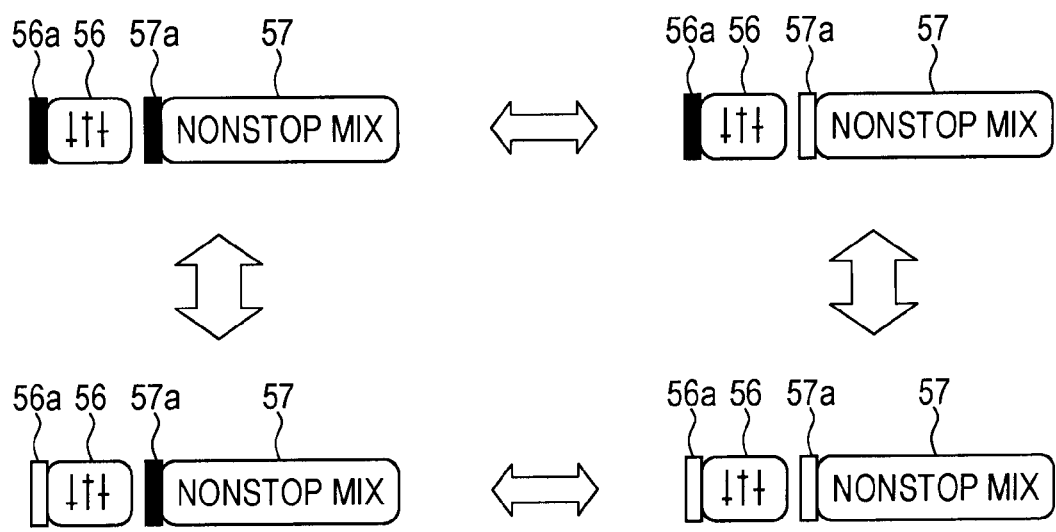
FIG. 5 illustrates the switching on and off of indicators.

In other words, the switching on and off of the indicator 56a is independent of the switching on and off of the indicator 57a, as illustrated in FIG. 5. The upper-left part of FIG. 5 illustrates a state in which both the indicator 56a and the indicator 57a are switched off, while the upper-right part of FIG. 5 illustrates a state in which the indicator 56a is switched off but the indicator 57a is switched on. The lower-left part of FIG. 5 illustrates a state in which the indicator 56a is switched on but the indicator 57a is switched off, while the lower-right part of FIG. 5 illustrates a state in which both the indicator 56a and the indicator 57a are switched on.

Next, the control panel 63 displayed in the function UI display area 44 of the content playback screen 41 will be described with reference to FIG. 6.

Figure 6:
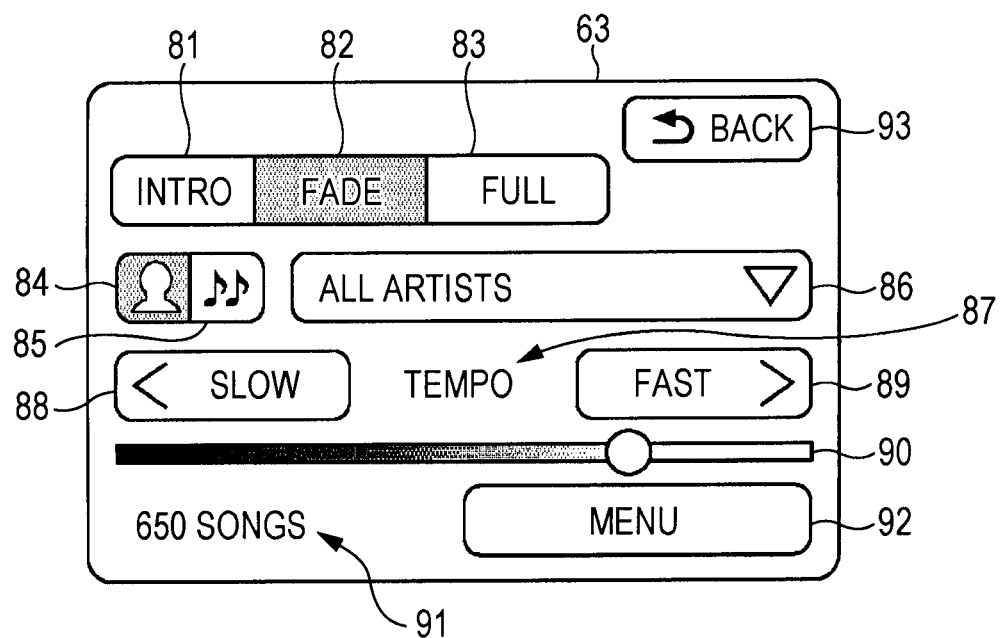
FIG. 6 illustrates a control panel.

As illustrated in FIG. 6, displayed on the control panel 63 are an intro button 81, a fade button 82, a full playback button 83, a select artist button 84, a select genre button 85, a pull-down menu 86, a parameter display section 87, parameter adjustment buttons 88 and 89, a color bar 90, a candidate song count display section 91, a display menu button 92, and a back button 93.

The intro button 81, fade button 82, and full playback button 83 are GUI components for specifying the playback method for a nonstop mix, and are selectable in a mutually exclusive manner.

By selecting the intro button 81, intro playback is conducted in which just the intro portions of songs are played back. Herein, the intro button 81 is selected by default. By selecting the fade button 82, crossfading playback is conducted in which the last song fades out and the next song fades in when changing songs. The exemplary display in FIG. 6 depicts a state in which the fade button 82 has been selected. By selecting the full playback button 83, full playback is conducted in which songs are played back in their entirety.

The select artist button 84 and the select genre button 85 are GUI components for selecting artists or genres to be used as filter conditions for filtering candidate songs for playback, and are selectable in a mutually exclusive manner.

By selecting the select artist button 84, the user becomes able to use the pull-down menu 86 to specify one or more artists to use as filter conditions. The exemplary display in FIG. 6 depicts a state in which the select artist button 84 has been selected. Conversely, by selecting the select genre button 85, the user becomes able to use the pull-down menu 86 to specify one or more genres to use as filter conditions.

The pull-down menu 86 is a GUI component used to specify filter conditions by artist or genre. For example, in the case where the select artist button 84 has been selected, the user is able to operate the pull-down menu 86 to view a displayed list of artists for all songs registered in the library, and specify one or more desired artists. Herein, all artists are selected by default. As another example, in the case where the select genre button 85 has been selected, the user is able to operate the pull-down menu 86 to view a displayed list of genres for all songs registered in the library, and specify one or more desired genres.

Displayed in the parameter display section 87 is the name of the parameter currently set for adjustment by the parameter adjustment buttons 88 and 89. The exemplary display in FIG. 6 depicts tempo as being the parameter set for adjustment. The parameter set for adjustment can be selected from a menu screen discussed later with reference to FIG. 7.

The parameter adjustment buttons 88 and 89 are GUI components for adjusting parameters. Operations performed on the parameter adjustment button 88 lower the value of a parameter, while operations performed on the parameter adjustment button 89 raise the value of a parameter. The exemplary display in FIG. 6 depicts tempo as being the parameter set for adjustment, with operations performed on the parameter adjustment button 88 adjusting the parameter to a slower tempo, and operations performed on the parameter adjustment button 89 adjusting the parameter to a faster tempo.

The color bar 90 is a GUI component that visually expresses the current parameter value within an adjustment range defined for the parameter currently set for adjustment. In addition, the color bar 90 is expressed by a smooth color gradient, with the color at the position of a slider positioned in correspondence with the current parameter value being synchronized with the background color of the cover art display section 62. In other words, the background color of the cover art display section 62 changes according to the parameter value.

Displayed in the candidate song count display section 91 is a count of the number of songs that have been extracted as playback candidates by the playlist creator 22, according to the current parameter or filter conditions.

Figure 7:
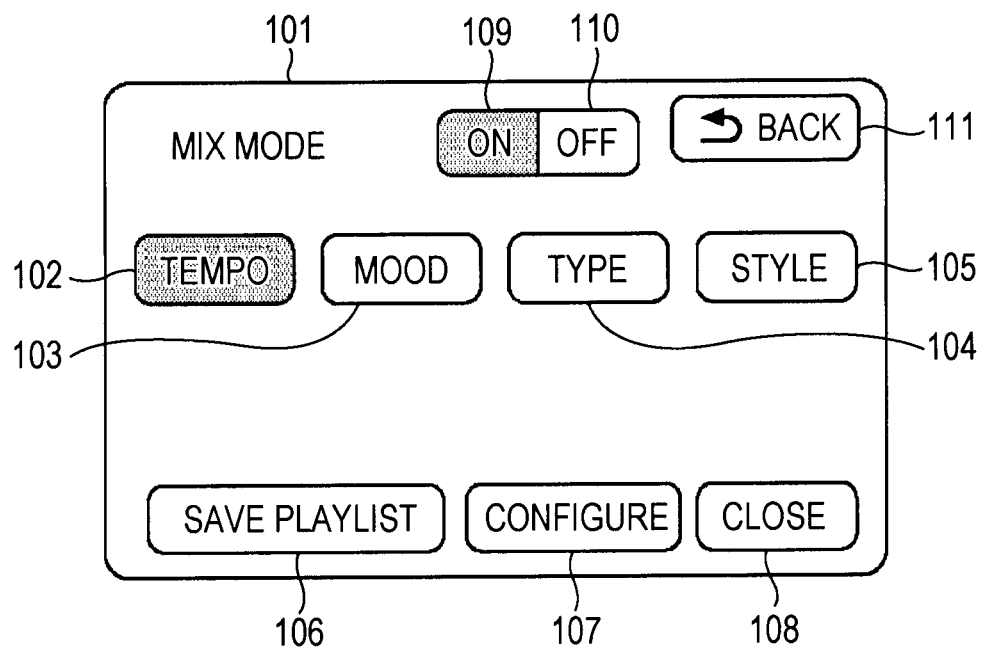
FIG. 7 illustrates a menu screen.

The display menu button 92 is a GUI component for displaying a menu screen (see FIG. 7). By operating the display menu button 92, display switches from the control panel 63 to a menu screen.

The back button 93 is a GUI component for switching the display of the control panel 63 to a previous display state from before the current display state.

By operating such a control panel 63, the user is able to more intuitively modify melodic parameters for songs given as candidates for playback. In other words, the user is able to modify the filtering of songs given as candidates for playback by simply operating the parameter adjustment buttons 88 and 89 so as to match the user's preferences relative to the song currently playing. In addition, the magnitude by which to modify a parameter can be changed according to the number of times the parameter adjustment buttons 88 and 89 are operated (i.e., pressed). The user is also able to visually acknowledge the parameter value with the color bar 90 and easily receive feedback on the parameter change.

Next, a menu screen displayed as a result of operating the display menu button 92 will be described with reference to FIG. 7.

As illustrated in FIG. 7, displayed on a menu screen 101 are a tempo button 102, a mood button 103, a type button 104, a style button 105, a save button 106, a configure button 107, a close button 108, an enable mix mode button 109, a disable mix mode button 110, and a back button 111.

The tempo button 102, mood button 103, type button 104, and style button 105 are GUI components for selecting a parameter to adjust with the parameter adjustment buttons 88 and 89 in FIG. 6. The exemplary display in FIG. 7 depicts the tempo button 102 as having been selected.

The save button 106 is a GUI component for saving a playlist created by the playlist creator 22. By operating the save button 106 at any time while a nonstop mix is playing, the user is able to save to the storage 15 a playlist containing a given number of playback history songs as well as playback candidate songs, including the song currently playing. For example, if the user likes the playlist containing the songs selected by the currently set parameter and filter conditions, the user may operate the save button 106, thereby causing a playlist containing 200 songs to be saved.

The configure button 107 is a GUI component for displaying a configure screen (not illustrated) used to configure various settings regarding nonstop mix playback. From the configure screen displayed as a result of operating the configure button 107, it is possible to configure settings such as the intro length during intro playback or the fade-out and fade-in times during crossfading playback. It is additionally possible to configure a setting that specifies in advance particular songs which are not to be selected as playback candidates when the playlist creator 22 creates a playlist. Furthermore, in the case where the content playback apparatus 11 is provided with functions for acquiring song features by analyzing songs stored in the storage 15, it is possible to issue instructions for executing such analysis from the configure screen. In this case, analyzed songs are added as playback candidates at a given timing once analysis finishes.

The close button 108 is a GUI component for closing the menu screen 101 and displaying the control panel 63.

The enable mix mode button 109 and disable mix mode button 110 are GUI components for enabling or disabling filtering by melodic parameters such as tempo, mood, type, or style. The enable mix mode button 109 and disable mix mode button 110 are selectable in a mutually exclusive manner. The exemplary display in FIG. 7 depicts the enable mix mode button 109 as having been selected.

Filtering by melodic parameters is enabled by selecting the enable mix mode button 109, filtering by melodic parameters is disabled by selecting the disable mix mode button 110. Meanwhile, in the case where filtering by melodic parameters is disabled, songs are filtered by artist or genre instead, and the parameter display section 87 as well as the parameter adjustment buttons 88 and 89 are no longer displayed on the control panel 63 displayed after applying such a setting.

The back button 111 is a GUI component for switching the display of the menu screen 101 to a previous display state from before the current display state.

Additionally, if the parameter set for adjustment is changed on the menu screen 101, the changed parameter is displayed in the parameter display section 87 on the control panel 63.

Figure 8A:
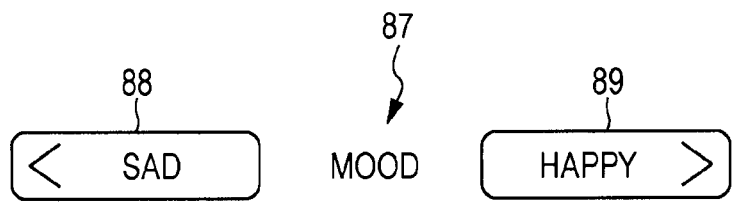
FIGS. 8A to 8C are diagrams used to describe changes in display according to parameters.
Figure 8B:
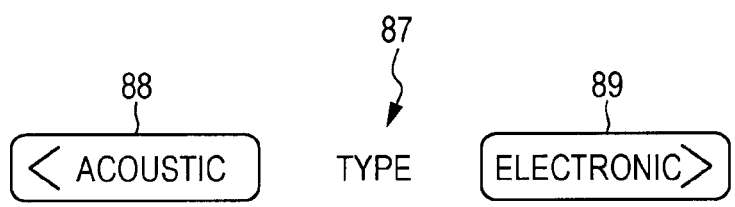
Figure 8C:
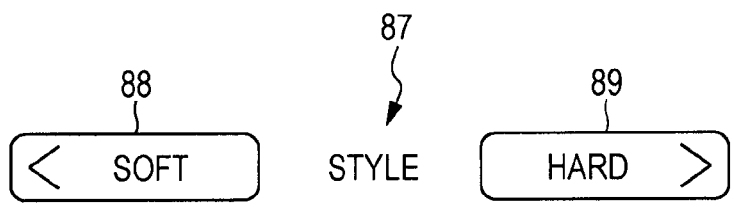

Next, FIGS. 8A to 8C will be used to describe changes in the display of the control panel 63 due to selecting a parameter to adjust on the menu screen 101.

For example, in the case where the mood button 103 is selected on the menu screen 101, mood is depicted as the parameter set for adjustment in the parameter display section 87, as illustrated in FIG. 8A. FIG. 8A also illustrates how operations performed on the parameter adjustment button 88 adjust the parameter towards a sadder mood, whereas operations performed on the parameter adjustment button 89 adjust the parameter towards a happier mood.

Also, in the case where the type button 104 is selected on the menu screen 101, type is depicted as the parameter set for adjustment in the parameter display section 87, as illustrated in FIG. 8B. FIG. 8B also illustrates how operations performed on the parameter adjustment button 88 adjust the parameter towards a more acoustic type of sound, whereas operations performed on the parameter adjustment button 89 adjust the parameter towards a more electronic type of sound.

Also, in the case where the style button 105 is selected on the menu screen 101, style is depicted as the parameter set for adjustment in the parameter display section 87, as illustrated in FIG. 8C. FIG. 8C also illustrates how operations performed on the parameter adjustment button 88 adjust the parameter towards a softer style, whereas operations performed on the parameter adjustment button 89 adjust the parameter towards a harder style.

It should be noted that while FIGS. 8A-8C show individual parameter adjustment buttons, it should be also noted that any combination of these buttons could be simultaneously used to adjust a playlist. For example, a combination of mood, type and/or style buttons may be selected to perform the adjustment. Moreover, these buttons may be combined so that one button corresponds to a plurality of the different parameters.

In this way, since the display of the parameter adjustment buttons 88 and 89 change according to the parameter set for adjustment, the user is able to more intuitively modify parameters.

Figure 9:
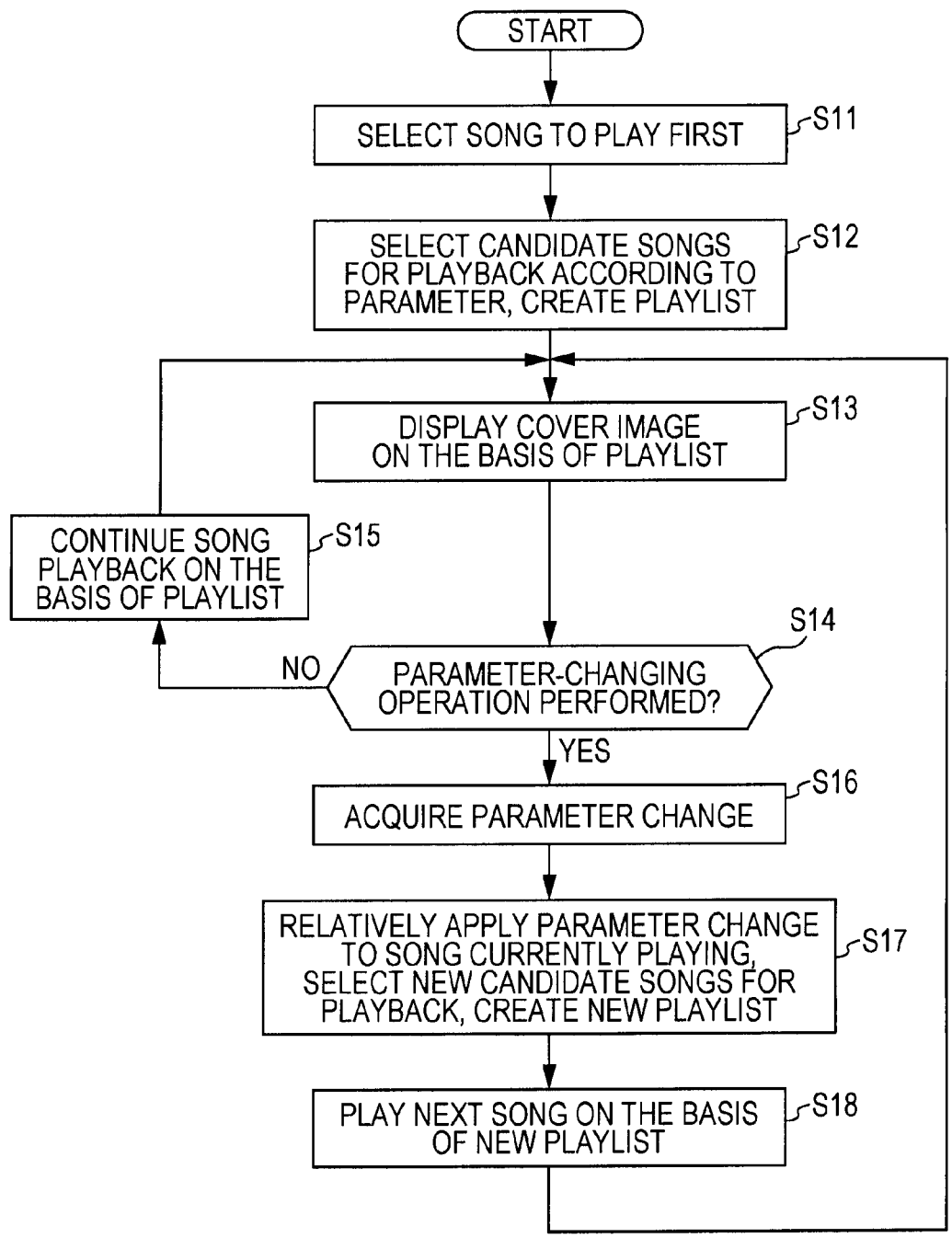
FIG. 9 is a flowchart used to describe a process by which a content playback apparatus plays back a nonstop mix.
Figure 10A:
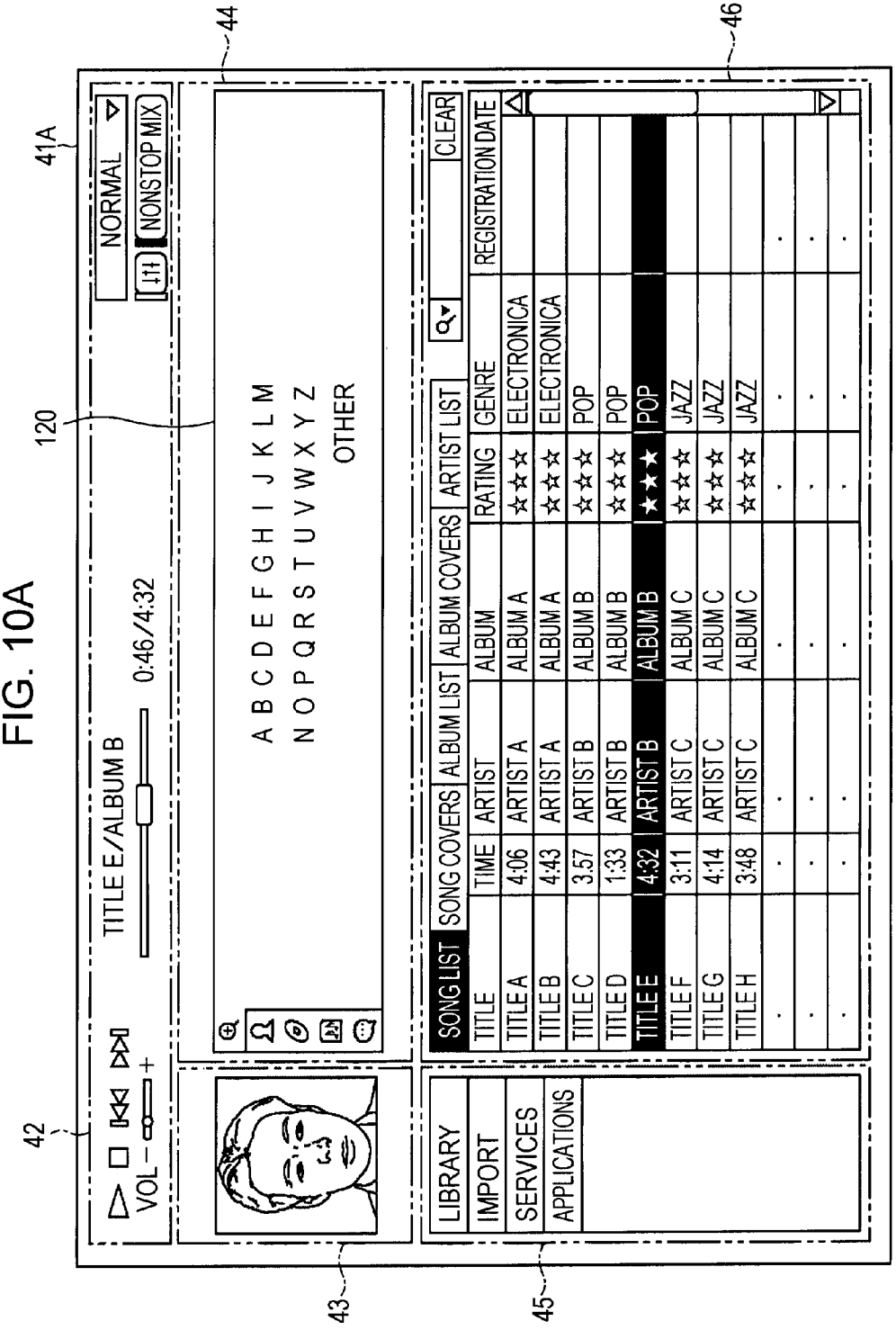

Next, FIG. 9 is a flowchart used to describe a process by which the content playback apparatus 11 plays back a nonstop mix.

For example, the process may be initiated if the user uses the operable unit 12 to operate the nonstop mix button 57 and issue instructions for playing back a nonstop mix.

In step S11, the playlist creator 22 selects the song to play back first in the nonstop mix.

For example, songs from when the last nonstop mix ended (i.e., the song that was playing at the time and a given number of songs before and after) may be stored in the configuration information storage 23, and the playlist creator 22 may select the song that was playing last as the song to play back first. By default, it may be configured such that the song to play back first is randomly selected from among songs registered in the library. Once the playlist creator 22 selects a song to play back first, the playback controller 24 applies control to play back that song, and the process proceeds to step S12.

In step S12, the playlist creator 22 selects candidate songs for playback according to a parameter, and creates a playlist.

For example, the specified parameter from the last nonstop mix ended may be stored in the configuration information storage 23, and the playlist creator 22 may select candidate songs for playback according to that parameter. The playlist creator 22 may then create a playlist that combines songs selected according to the parameter. In addition, a given number of songs before and after the song that was playing when the last nonstop mix ended may be incorporated into the playlist as-is. Herein, all parameters are set to their median values by default. The playlist creator 22 then supplies the created playlist to the configuration information storage 23 and the cover art display controller 25, and the process proceeds to step S13.

In step S13, the cover art display controller 25 displays cover images 61 in the cover art display section 62 of the content playback screen 41 in FIG. 2, on the basis of the playlist supplied from the playlist creator 22 in step S12. In other words, a now playing cover image 61a is displayed in the central part of the cover art display section 62, with playback history cover images 61b and playback candidate cover images 61c displayed to the left and right, respectively, in accordance with the order of songs in the playlist.

After the processing in step S13, the process proceeds to step S14, in which the operation information acquisition unit 21 determines whether or not a parameter-changing operation has been performed. For example, the operation information acquisition unit 21 may determine that a parameter-changing operation has been performed if the user uses the operable unit 12 to operate the parameter adjustment buttons 88 and 89.

If the operation information acquisition unit 21 determines in step S14 that a parameter-changing operation has not been performed, the process proceeds to step S15 and the playback controller 24 continues to play back songs on the basis of the playlist stored in the configuration information storage 23. After the processing in step S15, the process returns to step S13 and similar processing is repeated thereafter. Note that the display in the cover art display section 62 changes in step S13 if the now playing song switches from a song recorded on one album to a song recorded on another album, for example.

In contrast, if the operation information acquisition unit 21 determines in step S14 that a parameter-changing operation has been performed, the process proceeds to step S16, in which the operation information acquisition unit 21 acquires the parameter change and supplies the value of the changed parameter to the playlist creator 22.

After the processing in step S16, the process proceeds to step S17, in which the playlist creator 22 relatively applies the parameter change to the song currently playing and selects new candidate songs for playback. For example, in the case where a parameter change that increases the song tempo occurs and the value of the changed parameter is supplied to the playlist creator 22, the playlist creator 22 may select song with a faster tempo than that of the song currently playing, in accordance with the changed parameter. The playlist creator 22 then creates a new playlist containing the new songs selected according to the parameter change, and supplies the created playlist to the configuration information storage 23 and the cover art display controller 25. The process then proceeds to step S18.

In step S18, the playback controller 24 plays the next song on the basis of the newly created playlist, or in other words, plays back a song reflective of the parameter change. The process then returns to step S13 and similar processing is repeated thereafter. Meanwhile, in this case, a cover image 61 of the album containing the song played back to reflect the parameter change is displayed as the now playing cover image 61a, and the playback candidate cover images 61c are switched out on the basis of the new playlist.

As above, while the content playback apparatus 11 is playing a nonstop mix, the user is able to modify melodic parameters to match his or her preferences (i.e., tastes) relative to the song currently playing, and thereby create a new playlist dynamically and in real time. Moreover, songs that match the user's preferences can be played back without ending abruptly. Meanwhile, a new playlist can also be created to match the user's preferences if there is a change in filter conditions according to artist or genre, similarly to changes in melodic parameters.

In this way, since a playlist that matches the user's own mood or atmosphere can be easily created, the user is able to enjoy listening to music at home for long periods, for example. Also, at occasions such as parties or events, the user is able to readily create a playlist matching the atmosphere of the moment, thereby increasing everyone's enjoyment.

Next, operations linking the function UI display area 44 with the library UI display area 46 will be described with reference to FIGS. 10A to 12B.

For example, if the content playback apparatus 11 is operated so as to play a nonstop mix while a song is playing, a nonstop mix will begin while playback of the current song continues.

In the content playback apparatus 11, songs can be played back by other playback methods besides a nonstop mix. For example, a content playback screen 41A like that illustrated in FIG. 10A may be displayed in the case where the user searches the library for a song to play back. Displayed in the function UI display area 44 of the content playback screen 41A is a user interface 120 that presents functions enabling the user to search for songs (such as the letters of the alphabet and an "other" category).

Suppose that while a song is being played back by a playback method other than a nonstop mix in this way, the user issues instructions to play back a nonstop mix. At this point, the content playback apparatus 11 begins a nonstop mix while continuing playback of the song currently playing. In the exemplary display in FIG. 10, a song named "Title E" and recorded on an album named "Album B" is currently playing.

Thus, a content playback screen 41B like that illustrated in FIG. 10B is displayed. A cover art display section 62 and a control panel 63 are displayed in the function UI display area 44 of the content playback screen 41B, similarly to the content playback screen 41 in FIG. 2.

As another example, while the content playback apparatus 11 is playing back a nonstop mix, the user may specify a song displayed in the library UI display area 46 and cause that song to interrupt the current song and start playing.

For example, FIG. 11A illustrates a content playback screen 41C displayed as a result of playing a nonstop mix, similarly to FIG. 2. On the content playback screen 41C, it is indicated that a song named "Title E" and recorded on an album named "Album B" is currently playing.

At this point, if the user performs an operation so as to play a song named "Title H" recorded on an album named "Album C", the song named "Title H" will be played back. Specifically, the song named "Title H" is played back if the user moves a mouse pointer over the row where the song named "Title H" is being displayed in the library UI display area 46, clicks that row, and then moves the mouse pointer to the cover art display section 62 while holding down the mouse button (commonly referred to as a drag-and-drop operation). Note that such an operation may be performed whether a song is playing or whether playback is stopped.

At this point, a cover image 61 of the album named "Album C" containing the song named "Title H" is displayed in the now playing display area 43, while also being displayed in the cover art display section 62 as the now playing cover image 61a, as depicted in the content playback screen 41D illustrated in FIG. 11B.

Furthermore, the playlist creator 22 relatively applies the currently set parameter to the new song that is now playing and thus creates a new playlist. Consequently, a dynamic display is presented such that the playback candidate cover images 61c are switched out, as described with reference to FIG. 4. Additionally, the playback history cover images 61b may be displayed in a lighter color than the other cover images 61 so as to indicate that operations will not be accepted.

In this way, a new playlist can be created by specifying a song to play, thereby making it possible to create a playlist that matches the user's tastes.

As another example, information on the song currently playing can be displayed in the library UI display area 46 by performing an operation on the now playing cover image 61a while the content playback apparatus 11 is playing a song as part of a nonstop mix.

For example, FIG. 12A illustrates a content playback screen 41E in which covers unrelated to the song currently playing are displayed in the library UI display area 46 while a nonstop mix is playing. Also, "Album Covers" is selected as the display format of the library UI display area 46, and a plurality of covers are being displayed on the content playback screen 41E.

Figure 12B:
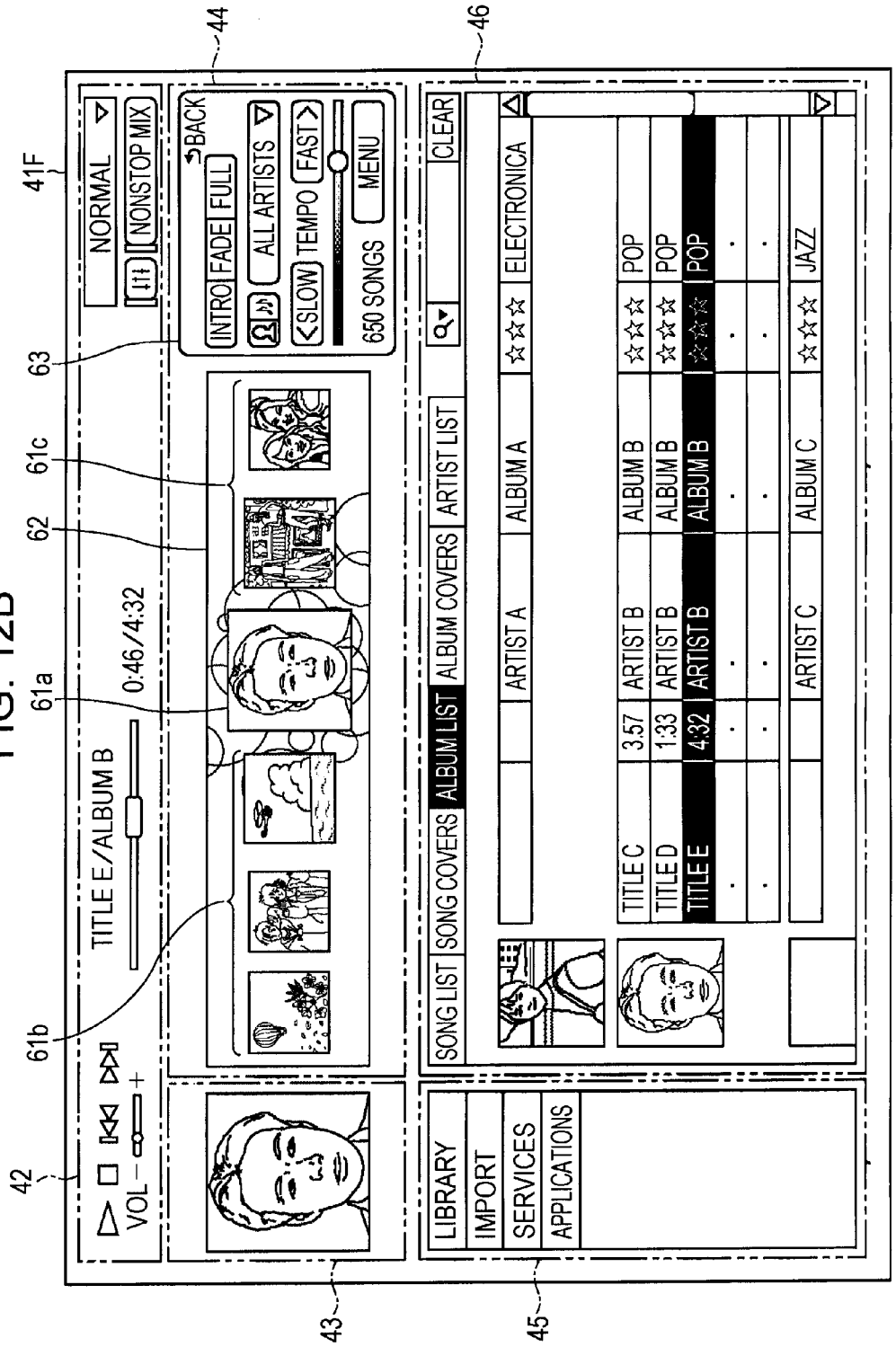

If the user subsequently operates the operable unit 12 to click the now playing cover image 61a, the library display controller 26 applies control so as to display information on the song currently playing in the library UI display area 46, as illustrated in FIG. 12B. At this point, "Album List" is selected as the display format of the library UI display area 46 on the content playback screen 41F.

In this way, by displaying information on the song currently playing in the library UI display area 46 in response to an operation on the now playing cover image 61a while a song is playing as part of a nonstop mix, the user is easily able to play back the entire album that contains the song currently playing when he or she is inclined to do so.

In addition, with the content playback apparatus 11 it is possible to save a playlist at any time by using the menu screen 101 as discussed earlier. For example, since with previous technology songs are played back after first saving a playlist that was created before song playback, there is an anticipated increase in unwanted playlists with little relevance to the compatibility with the user's tastes. In contrast, with the content playback apparatus 11a playlist can be saved while a nonstop mix is playing, thereby enabling the user to save just the playlists that match his or her tastes, and making it possible to avoid saving unwanted playlists.

Furthermore, the content played back by the content playback apparatus 11 is not limited to being songs as discussed in the foregoing, and may also be content such as still images (i.e., photos) and video.

As an example, a content playback screen displayed when playing back (i.e., viewing) photos with the content playback apparatus 11 will now be described with reference to FIG. 13.

FIG. 13 illustrates a base UI display area 42, a now playing display area 43, and a function UI display area 44 displayed on a content playback screen 141 that plays back (i.e., displays) photos. Other display areas have been omitted from illustration. The base UI display area 42 herein is similar to the base UI display area 42 on the content playback screen 41 in FIG. 2.

Displayed in the now playing display area 43 is a photo 161 being played back by the content playback apparatus 11.

In the function UI display area 44, a photo list display section 62' and a control panel 63' are displayed as a user interface reflecting the functions available for photo playback. Displayed in the photo list display section 62' are a now playing photo 161a, playback history photos 161b, and playback candidate cover images 161c.

Displayed in the control panel 63' are GUI components for selecting wipe, fade, and dissolve as effects used when switching the photo 161 displayed in the now playing display area 43. Also displayed in the control panel 63' are GUI components for specifying filter conditions used to playback candidates for the photo 161. In the exemplary display in FIG. 13, photos have been filtered by "Family Trip". Also displayed in the control panel 63' are GUI components for adjusting a parameter that specifies the atmosphere of playback candidates for the photo 161. For example, it may be possible to adjust a smile parameter by the degree of "smiling" or "frowning".

In this way, with the content playback apparatus 11 it is possible to categorize content such as song and photos by given metadata or by specific algorithms, and play back a nonstop mix of content that easily reflects the user's tastes. Moreover, content such as still images and video may also be played back in combination with songs in a nonstop mix.

The content playback apparatus 11 may also be configured to include a touch panel that combines the operable unit 12 and the display 13. In this case, the operation information acquisition unit 21 is able to acquire operation information in response to operations such as taps and double-taps on the touch panel.

Furthermore, rather than just being realized by a personal computer, the content playback apparatus 11 may also be realized by a device optimized for situations in which the user plays back songs. In other words, an embodiment of the present disclosure may be applied to various devices such as audio devices, mobile phone handsets, radio cassette recorders, dock, television receivers, and hard disk recorders, insofar as the device is equipped with functions for managing and playing back content such as music.

Meanwhile, the content playback apparatus 11 may not only use a database and songs stored in the storage 15, but may also use a database and songs provided via network not illustrated, for example. In other words, the database and songs may also be saved on a server connected via a network.

The foregoing series of operations may be executed in hardware, and may also be executed in software. In the case of executing the series of operations in software, a program constituting such software may be installed from a program recording medium storing the program onto a computer built into special-purpose hardware, or alternatively, onto a computer capable of executing various functions by installing various programs thereon, such as a general-purpose personal computer, for example.

Figure 14:
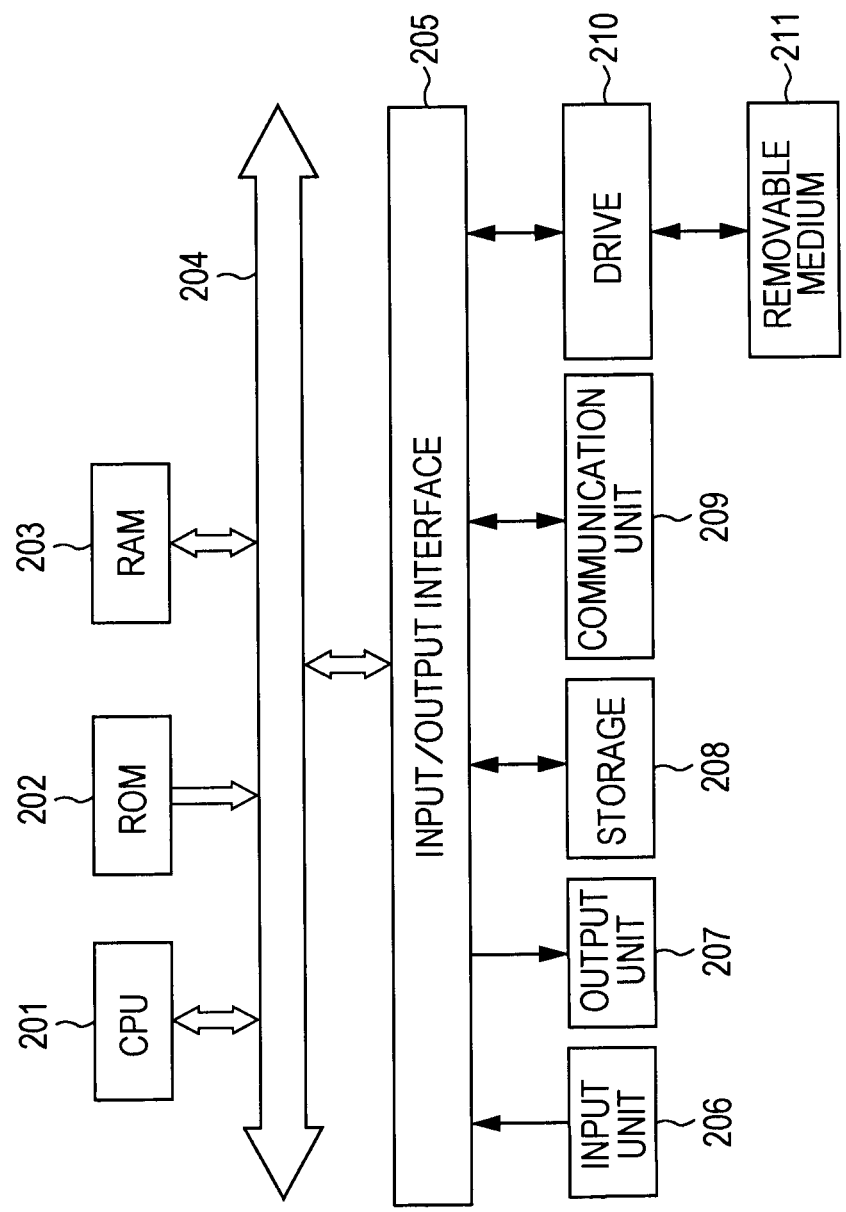
FIG. 14 is a block diagram illustrating an exemplary configuration of a computer according to an embodiment of the present technology.

FIG. 14 is a block diagram illustrating an exemplary hardware configuration of a computer that executes the foregoing series of operations according to a program.

In the computer, a central processing unit (CPU) 201, read-only memory (ROM) 202, and random access memory (RAM) 203 are connected to each other by a bus 204.

Also connected to the bus 204 is an input/output interface 205. Connected to the input/output interface 205 are an input unit 206 that may include devices such as a keyboard, mouse, and microphone, an output unit 207 that may include devices such as a display and one or more speakers, storage 208 that may include devices such as a hard disk and non-volatile memory, a communication unit 209 that may include devices such as a network interface, and a drive 210 that drives a removable medium 211 such as a magnetic disk, optical disc, magneto-optical disc, or semiconductor memory.

In a computer configured as above, the foregoing series of operations are conducted due to the CPU 201 loading a program stored in the storage 208 into the RAM 203 via the input/output interface 205 and the bus 204, and executing the program, for example.

The program executed by the computer (i.e., the CPU 201) may be provided by being recorded onto a removable medium 211 as an instance of packaged media such as magnetic disks (including flexible disks), optical discs (including Compact Disc-Read-Only Memory (CD-ROM) and Digital Versatile Disc (DVD)), magneto-optical discs, or semiconductor memory. Alternatively, the program may be provided via a wired or wireless transmission medium such as a local area network, the Internet, or satellite broadcasting.

The program may then be installed to the storage 208 via the input/output interface 205 by inserting a removable medium 211 into the drive 210. The program may also be received by the communication unit 209 via a wired or wireless transmission medium, and installed to the storage 208. Otherwise, the program may be preinstalled in the ROM 202 or the storage 208.

It should be appreciated that the operations described with reference to the flowchart discussed earlier are not limited to being processed in a time series following the order depicted in the flowchart, but may also be processed in parallel or individually (such as by parallel processing or object-orientated processing, for example). Furthermore, while the program may be processed by a single CPU, the program may also be processed in a distributed manner by a plurality of CPUs. Also, in this specification, the term "system" represents the totality of an apparatus composed of a plurality of apparatus.

The present technology may also take configurations like the following.

(1) An information processing apparatus comprising: a processing unit that controls a reproduction section to reproduce first content having a first melodic parameter; receives a user input corresponding to a change in the first melodic parameter; and controls the reproduction section to reproduce second content having a second melodic parameter based on the received user input.

(2) The information processing apparatus of (1), further comprising: a display that displays information corresponding to the first and second content.

(3) The information processing apparatus of (1) or (2), further comprising: a user interface that receives the user input corresponding to the change in the first melodic parameter.

(4) The information processing apparatus of (3), wherein the user interface includes a display that displays information associated with the first and second content.

(5) The information processing apparatus of (3), wherein the user interface includes a display that displays a plurality of icons representing an increase or decrease of the first melodic parameter.

(6) The information processing apparatus of any one of (1) to (5), further comprising: the reproduction section that reproduces the first and second content.

(7) The information processing apparatus of any one of (1) to (6), further comprising: a memory that stores the first and second content.

(8) The information processing apparatus of any one of (1) to (7), further comprising: a memory that stores information associated with the first and second content.

(9) The information processing apparatus of (8), wherein the information associated with the first and second content includes at least one of a melodic parameter, a title, an artist, an album, a representative image, a rating and a registration date.

(10) The information processing apparatus of any one of (1) to (9), wherein the first and second melodic parameters are parameters corresponding to a tempo of the first and second content.

(11) The information processing apparatus of any one of (1) to (10), wherein the first and second melodic parameters are parameters corresponding to a mood of the first and second content.

(12) The information processing apparatus of any one of (1) to (11), wherein the first and second melodic parameters are parameters corresponding to a type of the first and second content.

(13) The information processing apparatus of any one of (1) to (12), wherein the first and second melodic parameters are parameters corresponding to a genre of the first and second content.

(14) The information processing apparatus of any one of (1) to (13), wherein the first content and the second content are included in a same playlist of content.

(15) The information processing apparatus of any one of (1) to (14), wherein the processing unit searches a memory for content having a melodic parameter corresponding to the second melodic parameter upon receiving the user input.

(16) The information processing apparatus of (15), wherein the processing unit generates a playlist of content including the second content based on a result of the search.

(17) The information processing apparatus of (16), wherein the processing unit controls the reproduction section to reproduce the content included in the generated playlist.

(18) The information processing apparatus of (17), wherein the processing unit controls a display to display representative images corresponding to content currently being reproduced, content recently reproduced and upcoming content for reproduction based on the generated playlist.

(19) The information processing apparatus of (18), wherein the representative images corresponding to the content are images of album covers corresponding to the content.

(20) The information processing apparatus of (18), wherein the processing unit receives a user selection corresponding to one of the displayed representative images, retrieves additional information corresponding to the user selection, and causes the display to display the retrieved additional information.

(21) An information processing method performed by an information processing apparatus, the method comprising: controlling a reproduction section to reproduce first content having a first melodic parameter; receiving a user input corresponding to a change in the first melodic parameter; and controlling the reproduction section to reproduce second content having a second melodic parameter based on the received user input.

(22) A non-transitory computer-readable medium including computer-program instructions, which when executed by an information processing apparatus, cause the information processing apparatus to perform a method, the method comprising: controlling a reproduction section to reproduce first content having a first melodic parameter; receiving a user input corresponding to a change in the first melodic parameter; and controlling the reproduction section to reproduce second content having a second melodic parameter based on the received user input.

It should be appreciated that an embodiment of the present disclosure is not limited to the foregoing embodiments, and that various modifications are possible within a scope that does not depart from the principal matter of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   circuitry that
   controls reproduction of a playlist including first content having a first melodic parameter;
   receives a user input corresponding to a change in the first melodic parameter;
   controls modification of the playlist to include second content having a second melodic parameter based on the received user input; and
   displays in a display area representative images corresponding to content included in the playlist,
   wherein, when the playlist is modified, the displayed representative images are modified to correspond to content included in the modified playlist such that images corresponding to content that is removed from the playlist are displayed as shrinking and moving down to a bottom of the display area and images corresponding to content that is added to the playlist are displayed as moving down from a top of the display area.

2. The information processing apparatus of claim 1, further comprising:
   a display that displays information corresponding to the first and second content.

3. The information processing apparatus of claim 1, further comprising:
   a user interface that receives the user input corresponding to the change in the first melodic parameter.

4. The information processing apparatus of claim 3, wherein
   the user interface includes a display that displays information associated with the first and second content.

5. The information processing apparatus of claim 3, wherein
   the user interface includes a display that displays a plurality of icons representing an increase or decrease of the first melodic parameter.

6. The information processing apparatus of claim 1, wherein the circuitry reproduces the first and second content.

7. The information processing apparatus of claim 1, further comprising:
   a memory circuit that stores the first and second content.

8. The information processing apparatus of claim 1, further comprising:
   a memory circuit that stores information associated with the first and second content.

9. The information processing apparatus of claim 8, wherein
   the information associated with the first and second content includes at least one of a melodic parameter, a title, an artist, an album, a rating and a registration date.

10. The information processing apparatus of claim 1, wherein
    the first and second melodic parameters are parameters corresponding to a tempo of the first and second content.

11. The information processing apparatus of claim 1, wherein
    the first and second melodic parameters are parameters corresponding to a mood of the first and second content.

12. The information processing apparatus of claim 1, wherein
    the first and second melodic parameters are parameters corresponding to a type of the first and second content.

13. The information processing apparatus of claim 1, wherein
    the first and second melodic parameters are parameters corresponding to a genre of the first and second content.

14. The information processing apparatus of claim 1, wherein
    the first content and the second content are included in the modified playlist.

15. The information processing apparatus of claim 1, wherein the circuitry searches a memory circuit for content having a melodic parameter corresponding to the second melodic parameter upon receiving the user input.

16. The information processing apparatus of claim 15, wherein the circuitry modifies the playlist to include the second content based on a result of the search.

17. The information processing apparatus of claim 16, wherein the circuitry controls reproduction of the content included in the modified playlist.

18. The information processing apparatus of claim 17, wherein the circuitry controls a display to display representative images corresponding to content currently being reproduced, content recently reproduced and upcoming content for reproduction based on the modified playlist.

19. The information processing apparatus of claim 18, wherein the representative images corresponding to the content are images of album covers corresponding to the content.

20. The information processing apparatus of claim 18, wherein the circuitry receives a user selection corresponding to one of the displayed representative images, retrieves additional information corresponding to the user selection, and causes the display to display the retrieved additional information.

21. An information processing method performed by an information processing apparatus, comprising:
    controlling, with circuitry, reproduction of a playlist including first content having a first melodic parameter;
    receiving, at the circuitry, a user input corresponding to a change in the first melodic parameter;
    controlling, with the circuitry, modification of the playlist to include second content having a second melodic parameter based on the received user input;
    displaying, with the circuitry and in a display area, representative images corresponding to content included in the playlist,
    wherein, when the playlist is modified, the displayed representative images are modified to correspond to content included in the modified playlist such that images corresponding to content that is removed from the playlist are displayed as shrinking and moving down to a bottom of the display area and images corresponding to content that is added to the playlist are displayed as moving down from a top of the display area.

22. A non-transitory computer-readable medium including computer-program instructions, which when executed by an information processing apparatus, cause the information processing apparatus to perform a method, the method comprising:
    controlling reproduction of a playlist including first content having a first melodic parameter;
    receiving a user input corresponding to a change in the first melodic parameter;

controlling modification of the playlist to include second content having a second melodic parameter based on the received user input; and displaying in a display area representative images corresponding to content included in the playlist, wherein, when the playlist is modified, the displayed representative images are modified to correspond to content included in the modified playlist such that images corresponding to content that is removed from the playlist are displayed as shrinking and moving down to a bottom of the display area and images corresponding to content that is added to the playlist are displayed as moving down from a top of the display area.

* * * * *